(12) United States Patent
Hayton et al.

(10) Patent No.: US 7,194,743 B2
(45) Date of Patent: Mar. 20, 2007

(54) METHODS AND APPARATUS FOR COMMUNICATING CHANGES BETWEEN A USER INTERFACE AND AN EXECUTING APPLICATION USING PROPERTY PATHS

(75) Inventors: Richard Hayton, Burwell (GB); Dave Otway, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 740 days.

(21) Appl. No.: 09/846,896

(22) Filed: May 1, 2001

(65) Prior Publication Data

US 2002/0120679 A1 Aug. 29, 2002

Related U.S. Application Data

(60) Provisional application No. 60/254,995, filed on Dec. 12, 2000.

(51) Int. Cl.
*G06F 3/00* (2006.01)
*G06F 9/44* (2006.01)
*G06F 9/46* (2006.01)
*G06F 13/00* (2006.01)

(52) U.S. Cl. ................... 719/315; 715/762; 719/318

(58) Field of Classification Search ........ 719/310–316, 719/318–320, 328, 330; 717/101–120; 345/762; 715/760–763
See application file for complete search history.

(56) References Cited

U.S. PATENT DOCUMENTS 5,057,996 A    10/1991    Cutler et al.
5,129,084 A    7/1992     Kelly, Jr. et al.
5,142,679 A    8/1992     Owaki et al.
5,291,587 A    3/1994     Kodosky et al.
5,297,279 A    3/1994     Bannon et al.
5,297,283 A    3/1994     Kelly, Jr. et al.

(Continued)

FOREIGN PATENT DOCUMENTS

AU    A-53031/98    8/1998

(Continued)

OTHER PUBLICATIONS

Krishmaswamy et al, Tapestry Developer's Guide, pp. 1-28.*
International Searching Authority, "International Search Report", PCT Application No. PCT/US01/48335, mailed on Feb. 10, 2003.

(Continued)

*Primary Examiner*—William Thomson
*Assistant Examiner*—Diem Ky Cao
(74) *Attorney, Agent, or Firm*—Choate, Hall & Stewart, LLP

(57) ABSTRACT

In one aspect the invention relates to a method of associating an element of a user-interface to a current state of a property in a system including an application having a plurality of components, wherein at least one component has a property, wherein each property is identified with an identifier. The method comprises associating the element of the user-interface with a property path, the property path including a concatenation of a plurality of identifiers, the concatenation of identifiers defining a path through the components of the application to a property at the end of the concatenation, and mapping the property path to a current state of the property at the end of the path defined by the concatenation of identifiers, to associate the element of the user-interface with the current state of that property.

49 Claims, 9 Drawing Sheets

U.S. PATENT DOCUMENTS

| | | |
|---|---|---|
| 5,321,841 A | 6/1994 | East et al. |
| 5,325,533 A | 6/1994 | McInerney et al. |
| 5,327,562 A | 7/1994 | Adcock |
| 5,339,430 A | 8/1994 | Lundin et al. |
| 5,341,477 A | 8/1994 | Pitkin et al. |
| 5,341,478 A | 8/1994 | Travis, Jr. et al. |
| 5,367,633 A | 11/1994 | Matheny et al. |
| 5,369,766 A | 11/1994 | Nakano et al. |
| 5,371,891 A | 12/1994 | Gray et al. |
| 5,386,558 A | 1/1995 | Maudlin et al. |
| 5,418,964 A | 5/1995 | Conner et al. |
| 5,423,041 A | 6/1995 | Burke et al. |
| 5,437,025 A | 7/1995 | Bale et al. |
| 5,485,617 A | 1/1996 | Stutz et al. |
| 5,499,343 A | 3/1996 | Pettus |
| 5,511,197 A | 4/1996 | Hill et al. |
| 5,515,536 A | 5/1996 | Corbet et al. |
| 5,517,617 A | 5/1996 | Sathaye et al. |
| 5,519,867 A | 5/1996 | Moeller et al. |
| 5,530,852 A | 6/1996 | Meske, Jr. et al. |
| 5,537,546 A | 7/1996 | Sauter |
| 5,548,723 A | 8/1996 | Pettus |
| 5,548,726 A | 8/1996 | Pettus |
| 5,566,302 A | 10/1996 | Khalidi et al. |
| 5,571,245 A | 11/1996 | Ooyabu et al. |
| 5,572,643 A | 11/1996 | Judson |
| 5,574,898 A | 11/1996 | Leblang et al. |
| 5,581,765 A | 12/1996 | Munroe et al. |
| 5,598,562 A | 1/1997 | Cutler et al. |
| 5,619,638 A | 4/1997 | Duggan et al. |
| 5,623,656 A | 4/1997 | Lyons |
| 5,657,390 A | 8/1997 | Elgamal et al. |
| 5,689,664 A | 11/1997 | Hapner et al. |
| 5,692,183 A | 11/1997 | Narayanan et al. |
| 5,701,451 A | 12/1997 | Rogers et al. |
| 5,710,918 A | 1/1998 | Lagarde et al. |
| 5,721,876 A | 2/1998 | Yu et al. |
| 5,752,031 A | 3/1998 | Cutler et al. |
| 5,737,592 A | 4/1998 | Nguyen et al. |
| 5,737,622 A | 4/1998 | Rogers et al. |
| 5,754,830 A | 5/1998 | Butts et al. |
| 5,764,915 A | 6/1998 | Heimsoth et al. |
| 5,768,505 A | 6/1998 | Gilchrist et al. |
| 5,819,093 A | 10/1998 | Davidson et al. |
| 5,838,906 A | 11/1998 | Doyle et al. |
| 5,838,910 A | 11/1998 | Domenikos et al. |
| 5,838,916 A | 11/1998 | Domenikos et al. |
| 5,850,548 A | 12/1998 | Williams .................. 395/701 |
| 5,859,971 A | 1/1999 | Bittinger et al. |
| 5,872,973 A | 2/1999 | Mitchell et al. |
| 5,877,757 A | 3/1999 | Baldwin et al. |
| 5,905,987 A | 5/1999 | Shutt et al. |
| 5,933,841 A | 8/1999 | Schumacher et al. |
| 5,937,160 A | 8/1999 | Davis et al. |
| 5,938,733 A | 8/1999 | Heimsoth et al. |
| 5,946,687 A | 8/1999 | Gehani et al. |
| 5,946,697 A | 8/1999 | Shen |
| 5,973,696 A | 10/1999 | Agranat et al. |
| 5,978,828 A | 11/1999 | Greer et al. |
| 5,978,842 A | 11/1999 | Noble et al. |
| 5,978,848 A | 11/1999 | Maddalozzo, Jr. et al. |
| 5,983,227 A | 11/1999 | Nazem et al. |
| 5,983,268 A | 11/1999 | Freivald et al. |
| 6,012,087 A | 1/2000 | Freivald et al. |
| 6,029,182 A | 2/2000 | Nehab et al. |
| 6,094,662 A | 7/2000 | Hawes |
| 6,101,510 A | 8/2000 | Stone et al. |
| 6,112,242 A | 8/2000 | Jois et al. |
| 6,161,126 A | 12/2000 | Wies et al. |
| 6,192,382 B1 | 2/2001 | Lafer et al. |
| 6,209,029 B1 | 3/2001 | Epstein et al. |
| 6,271,858 B1 | 8/2001 | Dalal et al. |
| 6,275,858 B1 | 8/2001 | Bates et al. |
| 6,304,895 B1 | 10/2001 | Schneider et al. |
| 6,305,012 B1 | 10/2001 | Beadle et al. |
| 6,311,185 B1 | 10/2001 | Markowitz et al. |
| 6,313,854 B1 | 11/2001 | Gibson |
| 6,360,250 B1 | 3/2002 | Anupam et al. |
| 6,363,398 B1 | 3/2002 | Andersen |
| 6,393,422 B1 | 5/2002 | Wone |
| 6,397,253 B1 | 5/2002 | Quinlan et al. |
| 6,429,880 B2 * | 8/2002 | Marcos et al. .............. 345/744 |
| 6,434,738 B1 | 8/2002 | Arnow |
| 6,457,103 B1 | 9/2002 | Challenger et al. |
| 6,507,856 B1 | 1/2003 | Chen et al. |
| 6,515,681 B1 | 2/2003 | Knight |
| 6,539,418 B2 | 3/2003 | Schneider et al. |
| 6,560,639 B1 | 5/2003 | Dan et al. |
| 6,571,245 B2 | 5/2003 | Huang et al. |
| 6,587,858 B1 | 7/2003 | Strazza |
| 6,622,168 B1 | 9/2003 | Datta |
| 6,631,512 B1 | 10/2003 | Onyeabor |
| 6,643,657 B1 | 11/2003 | Baird et al. |
| 6,655,586 B1 | 12/2003 | Back et al. |
| 6,658,624 B1 | 12/2003 | Savitzky et al. |
| 6,684,388 B1 | 1/2004 | Gupta et al. |
| 6,701,380 B2 | 3/2004 | Schneider et al. |
| 6,701,388 B1 | 3/2004 | Smith et al. |
| 6,738,804 B1 | 5/2004 | Lo |
| 6,742,045 B1 | 5/2004 | Albert et al. |
| 6,792,607 B1 * | 9/2004 | Burd et al. .................. 719/316 |
| 2001/0018648 A1 * | 8/2001 | Turner et al. .................. 703/22 |
| 2001/0042173 A1 | 11/2001 | Bala et al. |
| 2002/0004813 A1 | 1/2002 | Agrawal et al. |
| 2002/0007376 A1 | 1/2002 | Popp et al. |
| 2002/0042173 A1 | 4/2002 | Takamura |
| 2002/0049788 A1 | 4/2002 | Lipkin et al. |
| 2002/0059327 A1 | 5/2002 | Starkey |
| 2002/0065851 A1 | 5/2002 | Watson et al. |
| 2002/0099738 A1 | 7/2002 | Grant |
| 2003/0074634 A1 * | 4/2003 | Emmelmann ................ 715/513 |
| 2003/0079120 A1 | 4/2003 | Hearn et al. |

FOREIGN PATENT DOCUMENTS

| | | |
|---|---|---|
| EP | 0 483 576 A2 | 5/1992 |
| EP | 1016987 A2 | 7/2000 |
| GB | 2 327 836 A | 2/1999 |
| WO | WO 97/18635 | 5/1997 |
| WO | WO 99/59087 | 11/1999 |

OTHER PUBLICATIONS

Abe et al., "Distributed Cooperative Control for Sharing Applications Based on the MERMAID Multiparty and Multimedia Desktop Conferencing System," *NEC Research & Development*, Tokyo, Japan, 34(1):122-131, Jan. 1993.

Cheng et al., "On The Performance Issues of Object-Based Buffering," *Parallel and Distributed Information Systems,, International Conference*, IEEE, pp. 30-37, 1991.

Chu et al., "Creating a hypertext markup language document for an information server," *Behavior Research Methods, Instruments & Computers*, Psychonomic Society, Inc., 27(2):200-205, 1995.

Davis, "The Xerox PARC Map Server: An Interactive Hypermedia Map Viewer," *Database*, pp. 65-67, Apr./May 1995.

Droms, "Dynamic Host Configuration Protocol," *Network Working Group, Request for Comments: 1541*, Bucknell University, pp. 1-39, Oct. 1993.

Jem, "'Thin' vs. "Fat" Visualization Client,' *Advanced Visual Systems*, IEEE, pp. 772-788, 1998.

Köppen et al., "A practical approach towards active hyperlinked documents," *Computer Networks and ISDN Systems*, Elsevier Science B.V., 30:251-258, 1998.

Mitchell, "Leveraging Your Visual C++ Experience on the Internet with Thin Client Technology," *Microsoft Systems Journal*, Microsoft Corporation, pp. 1-16, Dec. 1996.

Singleton, "Wired on the Web," *Wired*, pp. 77-78 and 80, 1995.

Tessier, "Using JavaScript to Create Interactive Web Pages," *Dr. Dobb's Journal*, Boulder, Colorado, pp. 84-97, Mar. 1996.

Berberich, M., et al. "Building Web-based Knowledge Clusters." *IEEE*. Jun. 26, 1998; 1-4, retrieved from IEEE database Nov. 17, 2003.

Challenger, J., et al. "A Publishing System for Efficiently Creating Dynamic Web Content." *IEEE INFOCOM*. 2000; 844-53.

Davis, P. "An Interactive Hypermedia Map Viewer." *Database*. Apr. 1995; 65-7.

Goschka, K.M., et al. "Development of an Object Oriented Framework for Design and Implementation of Database Powered Distributed Web Applications with the DEMETER Project as a Real-Life Example." *IEEE*. 1997; 132-37, retrieved Nov. 17, 2003.

Krishnaswamy, H., et al. "Tapestry Developer's Guide," pp. 1-28.

Liu, H., et al. "Model and Research Issues for Refreshing a Very Large Website." *Web Information Systems Engineering*. 2000; 291-5.

McIlhagga, M., et al. "Towards a Design Methodology for Adaptive Applications." *AMC Portal Database*. 1998; 133-44, retrieved Nov. 17, 2003.

Putz, S. "Interactive information services using World-Wide Web hypertext," *Computer Networks and ISDN Systems*. 1994; 273-80.

Sneed, H.M., et al. "A Case Study in Software Wrapping, Proceedings of the International Conference on Software Maintenance." *ICSM*. 1998; 86-93.

Van Hoff, A. "Java and Internet Programming." 56, 58-9, 101-2.

U.S. Appl. No. 09/704,904, filed Nov. 2, 2001, Hayton et al.
U.S. Appl. No. 09/704,948, filed Nov. 2, 2001, Hayton et al.
U.S. Appl. No. 09/705,170, filed Nov. 2, 2001, Hayton et al.
U.S. Appl. No. 09/704,857, filed Nov. 2, 2001, Hayton et al.
U.S. Appl. No. 09/704,896, filed Nov. 2, 2001, Hayton et al.

Herb, "The Animator Applet (1.0.2)—example 1" in http://www.columbia.edu/cu/help/jdk/demo/Animator/1.0.2/Animator java vol. 1.9 pp. 19 pgs., Dec. 6, 1996.

AU Examiner Report on 24480/01 (Oct. 9, 2003) 2 Pages.

EPO International Search Report to PCT/US00/34848 (May 18, 2001) 8 pages.

EPO International Preliminary Examination Report to PCT/US00/34848 (May 6, 2002) 6 pages.

EPO "Communication Pursuant to 96(2) EPC" 00 988 253. 1-2201 (Aug. 25, 2003) 4 pagees.

EPO "Communication Pursuant to 96(2) EPC" 00 988 253. 1-2201 (Oct. 17, 2002) 2 pages.

International Searching Authority, "International Search Report," PCT Application No. PCT/US01/45272, mailed on Apr. 4, 2003, 5 pgs.

\* cited by examiner

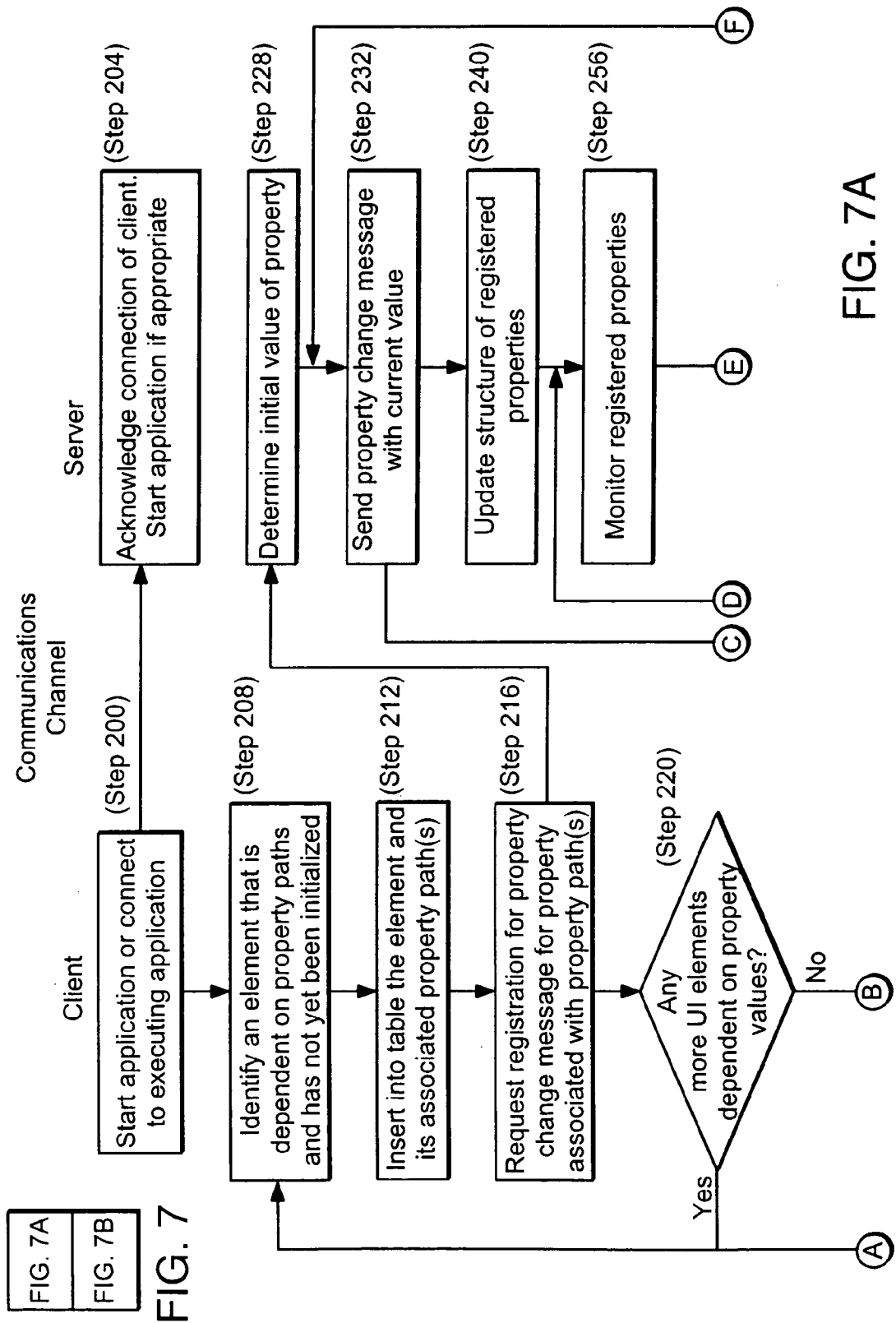

METHODS AND APPARATUS FOR COMMUNICATING CHANGES BETWEEN A USER INTERFACE AND AN EXECUTING APPLICATION USING PROPERTY PATHS

CROSS-REFERENCE TO RELATED APPLICATIONS

This application claims the benefit of and priority to the co-pending U.S. Provisional Application, Ser. No. 60/254,995, filed Dec. 12, 2000, entitled "Methods And Apparatus For Interactive Thin-Client Applications Using Property Paths," the entirety of which is incorporated herein by reference.

FIELD OF THE INVENTION

The present invention relates to client-server networks and, in particular, to methods and apparatus for associating an element of a user-interface to a current state of a property.

BACKGROUND OF THE INVENTION

Contemporary computer networks consist of a number of computer systems, called nodes, communicating with other computer systems via communication links. Typically, some of the nodes are client nodes and other nodes are server nodes. A client node formulates and delivers queries to a server node. A user of the client node enters the queries through a user-interface operating on the client node. The server node evaluates the queries and delivers responses to the client node for display on the client user-interface.

Usually, the server nodes host a variety of application programs or processes that can be accessed and executed by client nodes. When a client node launches an application program, the execution of that application program can occur at either the client node or the server node, depending upon the computing model followed by the computer network.

In a client-based computing model, the application program is packaged and sent down to, or pre-installed on, the client node, allowing the client node to run the application using the resources of the client node. This approach has several drawbacks. First, the client node must have sufficient memory, disk space, and processing power to effectively execute the application. A related problem that occurs using this model is that the number of applications a given client is able to execute is limited due to client resource constraints. Further, applications built this way are complex to develop and maintain and typically require modification or "porting" for all supported client computer system types. Moreover, this technique exacerbates the administration burden on a network administrator.

In a server-based computing model, the server node executes the application program, and only the control information for the client user-interface is transmitted across the computer network to the client node for display. Using this approach, user-interface events must be sent between the client and the server in order for the server application to process the events. This may result in perceived delays of user-interface response. Further, the application program must be specifically written, or changed, to support the user-interface on the client node. This increases the complexity of the application and prevents this technique from being useful with off-the-shelf applications.

A refinement of the server-based model is to supplant the device driver to which the application communicates in order to send screen and device updates back and forth between the client and the server. This approach avoids requiring applications to be rewritten. However, this approach requires device information to be sent between the client and the server in order to maintain the client display, again introducing perceived latency into the interface. Further, server-side processing requirements are increased in order to satisfy resulting device information required for communication with each connected client.

A recent, further refinement of the server-based model is to deploy the user-interface portion of the application as a mark-up language document such as Hyper Text Markup Language (HTML) document. However in using this approach, information sent from the server application to the client begins to "age" immediately. In other words the information may change on the server but the client would not automatically be notified and updated. Further, with this approach, interactivity requires context switching between pages even to perform simple tasks.

Standard and emerging approaches to application development for Web application delivery rely on one of two approaches. The first approach is adapting 'page based' application delivery code (e.g., servlets) to more dynamic use (e.g., sequence of servlets). The second approach is wiring user-interface components to server components. The first approach has the advantage of remaining Web-centric and within the skill set of Web developers, but is limited by its page-based roots. Generating applications with a user-interface using several pages (or dialogues) typically requires coordinating the server-side components to generate each page on an individual basis. This coordination becomes very difficult as the number of pages or the number of clients increases. The second approach, wiring, still requires the application developer to deal with the dynamic aspects of the application, as a developer must wire to existing object instances that the wiring tool knows about. This is typically objects that exist at application start up, or at other well defined times. The second approach typically requires customized tools to perform all aspects of UI design, including layout and formatting.

SUMMARY OF THE INVENTION

The present invention avoids these shortcomings. The present invention provides a mechanism by which the user-interface portion of the application can be delivered to the computer user either on the same machine on which the application is executing or on another machine remote from the machine executing the application. The invention separates the user-interface from the underlying application enabling the design of the user interactive portion of the application to be relatively straightforward.

The invention also permits the user interactive portion to be deployed on a wide range of client hardware environments without bringing with it all the required logic for performing the functionality of a particular application. These features give the user the effect of directly interacting with the application even though the application is potentially running somewhere else. User-interface, event handling and screen rendering logic stay on the client, thus dramatically reducing network traffic and latency. The invention also allows the user-interface portion to be connected with objects that do not currently exist, but may exist in the future. This makes it easier to specify connections. The invention connects the user-interface to objects using property paths. Property paths represent abstract paths and this abstract quality allows the UI to be connected to objects that may exist in the future but that do not exist at application startup or any other well defined point in time.

In one aspect the invention relates to a method of associating an element of a user-interface to a current state of a property in a system including an application having a plurality of components, wherein at least one component has a property, wherein each property is identified with an identifier. The method comprises associating the element of the user-interface with a property path, the property path including a concatenation of a plurality of identifiers, the concatenation of identifiers defining a path through the components of the application to a property at the end of the concatenation, and mapping the property path to a current state of the property at the end of the path defined by the concatenation of identifiers, to associate the element of the user-interface with the current state of that property. In another embodiment, the method includes a) examining each identifier in the concatenation of the property path in succession, b) determining, for the first identifier in the concatenation of the property path, a second state of a property with a name identical to the first identifier, a component of the application containing that property becoming a root application component; c) identifying, for the first identifier, a component of the application to which the second state points as a current application component, d) mapping the first identifier to the second state, e) determining for the next identifier in the concatenation of the property path, a next state of a property with a name identical to the next identifier located within the current application component, f) identifying, for the next identifier, a component of the application to which the next state points as a current application component, g) mapping the next identifier to the next state, and h) repeating steps e, f and g until the last identifier of the concatenation is examined to map the property path to the current state of the property with a name identical to the last identifier. In another embodiment, the method includes mapping the property path to an undefined state if no property is found that corresponds to an identifier in the plurality of identifiers in the concatenation.

In another embodiment, the method includes generating a node tree having a plurality of nodes, wherein each node of the node tree represents a mapping of an identifier to one of, a state of a property and an undefined state. In another embodiment, the node tree represents a plurality of property paths. In another embodiment, the method includes monitoring a plurality of states within the application to detect a change in one of the states of the plurality of states, each state in the plurality corresponding to one of the states mapped to an identifier in the concatenation of the property path. In another embodiment, the method includes receiving a property change event from a JAVABEAN-compatible component.

In another embodiment, the method includes re-mapping the property path to a new current state in response to detecting the change in one of the states of the plurality of states. In another embodiment, the method includes re-mapping the identifier the concatenation of identifiers to the changed state in response to detecting the change in one of the states of the plurality of states. In another embodiment, the method includes generating a property change message in response to a change in a state of a property corresponding to one of the identifiers in the concatenation of the property path. In another embodiment, the method includes updating one or more user-interface elements associated with the property path with a new current state in response to a change in the current state of the property.

In another embodiment, the method includes, a) detecting a change in one of a plurality of states in an application, each state in the plurality corresponding to one of the states mapped to an identifier in the concatenation of the property path, b) examining each identifier in the concatenation of the property path in succession, starting with an identifier corresponding to the changed one of the states of the plurality of states, c) determining for a currently examined identifier, a new next state of a property with a name identical to the currently examined identifier, d) re-mapping the currently examined identifier to the new next state in response to a change in a currently mapped state, and e) repeating steps c and d for each subsequent identifier in the concatenation of identifiers. In another embodiment, the method includes terminating the repeating in response to the new next state being identical to a state currently mapped for that currently examined identifier. In another embodiment, the method includes monitoring a new plurality of states within the application, the new plurality including the new next states mapped to an identifier in the concatenation of the property path.

In another embodiment, wherein the property path is a first property path and the concatenation of identifiers includes a wildcard identifier, the method includes mapping a second property path to a first value, and determining a second value for the wildcard identifier in response to the first value mapped to the second property path. In another embodiment, the method includes determining the second value such that replacing the wildcard identifier of the first property path with the second value causes the current state mapped to the first property path with the replaced wildcard identifier to be equal to the value mapped to the second property path. In another embodiment, the method includes dynamically binding the property path to one of the application components including the property corresponding to the current state mapped to that property path.

In another embodiment, the method includes transmitting to the application a request to update the current state of the property mapped to the property path associated with the element of the user-interface in response to a user modification of the value. In another embodiment, the method includes inhibiting a property change message in response to the application updating the current state of the property in response to the request to update. In another embodiment, wherein the user interface comprises an exemplary element associated with a property path including a wildcard identifier, the wildcard identifier corresponding to an indexed property including an index value range from a minimum value to a maximum value, the method includes generating an additional element for each index value of the indexed property from the minimum value to the maximum value by copying the given element associated with the property path, and associating a new property path with each additional element. In another embodiment, the method includes replacing the wildcard identifier associated with the given element with the corresponding index value of the additional element to define the new property path. In another embodiment, the method includes registering interest in the property path. In another embodiment, the method includes mapping one of the identifiers in the concatenation of the property path to a state of a property corresponding to the one of the identifiers.

In another embodiment, the invention relates to a system for associating an element of a user-interface to a current state of a property of an application, wherein the application has a plurality of components, at least one component having a property and each property is identified with an identifier. The system includes a property connector module to identify an association between the element of the user-interface and a property path, the property path including a concatenation of a plurality of identifiers, the concatenation of identifiers defining a path through the components of the application to a property at the end of the concatenation, and to map the property path to a current state of the property at the end of the path defined by the concatenation of identifiers, thereby associating the element of the user-interface with the current state of that property. In another embodiment, the system includes a client node. The client node includes the user interface having one or more elements, and a client portion of the property connector module. In another embodiment, the system includes a server node. The server node includes the application, and a server portion of the property connector module.

In another aspect, the invention relates to a method for creating a user-interface independently of an application with which the user interface interacts, wherein the application includes a plurality of components and at least one component contains a property, wherein each property is identified with an identifier. The method includes inserting at least one element into the user-interface, and associating at least one property path with one inserted element, the property path including a concatenation of a plurality of identifiers, the concatenation of identifiers defining a path through the components of the application to a property at the end of the concatenation. In another embodiment, the method includes determining a list of property paths associated with the application, and selecting the property path from the list to associate with the one inserted element of the user-interface from the list of property paths.

In another embodiment, the method includes receiving a property path description file associated with the application, the property path description file including a plurality of identifiers associated with the application and a relationship between the plurality of identifiers.

In another embodiment, the method includes executing the application, and interacting with the executing application to determine a plurality of identifiers associated with the application and a relationship between the plurality of identifiers. In another embodiment, the method includes transmitting a request to register for a property change message corresponding to the property path associated with the element of the user-interface. In another embodiment, the method includes providing at least one predefined element, and enabling selection from the at least one predefined element to insert the selected predefined element into the user-interface. In another embodiment, the predefined element comprises one of an image type user-interface element, an iterator type user-interface element, a text type user-interface element, a hidden type user-interface element, a value type user-interface element, a slider type user-interface element, a treeview type user-interface element, a button type user-interface element, an iframe type user-interface element, a tab type user-interface element, a flip-flop type user-interface element, a deck type user-interface element, a dropdown type user-interface element, a radio type user-interface element, and a script type user-interface element.

In another aspect, the invention relates to a system for creating a user-interface independently of an application with which the user interface interacts, wherein the application includes a plurality of components and at least one component contains a property, wherein each property is identified with an identifier. The system includes a property connector module to insert at least one element into the user-interface, and to associate at least one property path with one inserted element, the property path including a concatenation of a plurality of identifiers, the concatenation of identifiers defining a path through the components of the application to a property at the end of the concatenation. In another embodiment, the system includes a client node. The client node includes the user interface having one or more elements, and a client portion of the property connector module. In another embodiment, the system includes a server node. The server node includes the application, and a server portion of the property connector module.

In another aspect, the invention relates to a method using a system having an application comprising one or more objects, with at least one object including one or more properties. The method associates a user-interface element, which is independent of the application, with a property of the application. The method includes executing a process that is independent of the application; representing a property of the application by a property path and associating, by the application-independent process, the user-interface element with the property path. This associates the user-interface element with the property of the independent application. In one embodiment, the method determines whether a property of an object of the application exists that corresponds to the property path. In another embodiment, the determining process includes employing a value of a second property corresponding to a second property path (e.g., cross-mapping).

In another embodiment, the method includes monitoring a state of the property and detecting a change in the state of the property. In another embodiment, the process of detecting includes receiving a property change event from an API of a JAVABEAN™ compatible component. In another embodiment, the method includes updating the user-interface element in response to detecting the change in the state of the property. In another embodiment, the method includes generating a property change message in response to detecting the change in the state of the represented property. In another embodiment, the method includes registering for a property change message for the property represented by the property path. In another embodiment, the method includes detecting a change in a state of one or more properties along the property path, and responding to a detected change in a value that the property path represents.

In another embodiment, the method includes determining at least one property path associated with the application and selecting the property path to associate with the user-interface element from at least one determined property path. In another embodiment the process of determining at least one property path includes traversing from a root object of the application to a corresponding property, using object pointers. In another embodiment, this includes mapping the traversal from a root object of the application to the corresponding property. In another embodiment, the process of mapping includes generating a node tree. In another embodiment, the method includes indicating which nodes in the node tree correspond to a property path that the client has registered interest in. In another embodiment, the method includes dynamically binding the property path to the object containing the represented property.

In another embodiment, the method includes allowing a user to modify a value associated with the user-interface element and updating the property of the application represented by the property path associated with the user-interface element in response to a user modification of the value associated with the user-interface element. In another embodiment, the method includes inhibiting a property change message in response to updating the property of the application in response to the user modification.

In another aspect, the invention relates to a method using a server node having an application comprising a plurality of objects, with each object including one or more properties, the method indicating a property of the application to monitor. The method includes executing a process that is independent of the application, representing a property of the application by a property path and receiving, by the application-independent process, a request to register for a property change message associated with a property path to indicate the property of the independent application to monitor. In one embodiment, this method includes determining whether a property of an object of the application exists that corresponds to the property path. In another embodiment, the process of determining includes employing a value of a second property corresponding to a second property path (e.g., cross-mapping).

In another embodiment, the method includes monitoring a state of the property and detecting a change in the state of the property. In another embodiment, the process of detecting includes receiving a property change event from an API of a JAVABEAN™ compatible component. In another embodiment, the method includes transmitting the changed state in response to detecting the change in the state of the property. In another embodiment, the method includes generating a property change message in response to detecting the change in the state of the property. In another embodiment, the method includes registering the property change message of the request for the property represented by the property path.

In another embodiment, the method includes determining at least one property path associated with the application. In another embodiment, the process of determining at least one property path includes traversing from a root object of the application to a corresponding property by using object pointers. In another embodiment, the method includes mapping the traversal from a root object of the application to the corresponding property. In another embodiment the process of mapping includes generating a node tree. In another embodiment, the method includes indicating which nodes in the node tree correspond to a property path the client has registered interest in. In another embodiment, the method includes dynamically binding the property path to the object containing the represented property.

In another aspect, the invention relates to a method using a client node having a user-interface, including one or more elements, that is independent of an application, the method creating a user-interface element. The method includes executing a process independent of the application, employing an element of the user-interface, representing a property of the application by a property path and selecting, with the application-independent process, the property path or paths to associate with the user-interface element. In one embodiment, the method includes transmitting a request to register for a property change message associated with the selected property path.

In another embodiment, the method includes receiving the property change message in response to a change in a state of the property represented by the property path. In another embodiment, the method includes updating the user-interface element in response to notification of the change in the state of the property. In another embodiment, the method includes receiving at least one property path associated with the application. In another embodiment, the method includes allowing a user to modify a value associated with the user-interface element and transmitting the modified value and the associated property path. In another embodiment, the method includes inhibiting a property change message in response to transmitting the modified value associated with the user-interface element.

In another aspect, the process of employing an element includes providing to the user at least one predefined element for the user-interface, enabling the user to select from at least one predefined element for the user-interface and employing the selected predefined element. In another embodiment, the predefined element includes one or more of the following: displaying a property value as a piece of text, allowing the displayed property value to be edited, enabling a button that may be disabled based on the property value, vertical and horizontal sliders for numeric properties, displaying an image dependent on a property value, displaying an embedded frame dependent on a property value, an anchor dependent on a property value, ability to hide or show part of the UI dependent on a property and expression and the ability to change the style of part of a UI dependent on a property and expression. In another embodiment, the predefined element includes one or more of the following: selections of displaying one of a 'deck' of UI fragments dependent on a property value, a dropdown menu where each choice is a value from an range of indexed properties, one tab per member of a range of indexed properties, a set of radio buttons, a treeview based on property paths and the ability to repeat part of a UI once for each member of a range of indexed properties.

Some objects of this invention are as follows: to allow simple UI development for developers with little or no programming experience; to allow strong separation between application and UI development; to allow separation of UI static and dynamic aspects; to have low bandwidth and latency-tolerance communications; to allow device-clients to be tailored to the devices' capabilities; to require only a small learning curve for application and UI developers; and to allow for scalable servers.

To accomplish some of these objects, the invention includes a system for providing rich/highly interactive client interfaces to applications running on a centralized server (or servers). A key part of the system is that the interface between client and server is highly abstract and it can function with both other client types (other Web browsers and device specific clients) and other server types (e.g., COM).

The system uses a 'loose' coupling mechanism, which allows the server-side application to be designed with little regard for the user-interface. By maintaining this strong separation it is possible for a user-interface to be completely redesigned without access to the application code, or the infrastructure supporting it. For example a third party could generate a user-interface for a 'published' application without any access to the application code or runtime environment. The system also allows one application and the server on which it is located to be used with many different types of user-interfaces. New client types may be designed and deployed without touching the server code. A third party could design a new client type without the server's involvement. The user-interface for a particular application can be changed or ported to a new device without having to even stop the server application, let alone redesign or rebuild it. This is the 'number one want' on a recent survey of Web application designers. The user-interface can be tuned or given a new look and feel without disrupting the function of the application. This may be done using standard tools. As the user-interface is strongly separated from the server, different user-interfaces can be developed for different device capabilities. There is no intention that user-interfaces on difference clients should look identical. This simply makes it much easier to develop a client 'player' for a new device The system takes advantage of the fact that most user-interfaces are essentially static. A large portion of a user-interface does not change at all. A typical example is a form. The form itself is not modified during execution, but only the values that appear in the fields of the form. The dynamic aspect of a user-interface generally consists of changes to the static page 'template' such as filling in fields, changing text values and a navigation through a number of dialogs or pages under the control of the user and/or the application. For a Web-client, the static aspects of a user-interface generation, and the navigation aspects (under user control) are already well understood by users and developers alike. Rather than replace these with different notions, the invention keeps standard Web-metaphors. The invention adds only the ability to fill in a page template dynamically.

By keeping the interface between application and user-interface very small, and by separating the static and dynamic aspects of a UI, the invention allows the static aspect of a user-interface to be developed using standard UI development tools. These tools can be extended (or additional tools provided) to add the dynamic aspect of the UI. Because of the approach taken to the static/dynamic split, this is extremely straightforward for the UI developer. A unique aspect that the system brings to UI technology is the way in which dynamic aspects of the application (e.g., creation of new objects, changes in values) may be reflected in a static user-interface by linking UI elements.

The foregoing and other objects, features and advantages of the invention will be apparent from the following more particular description of the embodiments of the invention, as illustrated in the accompanying drawings.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
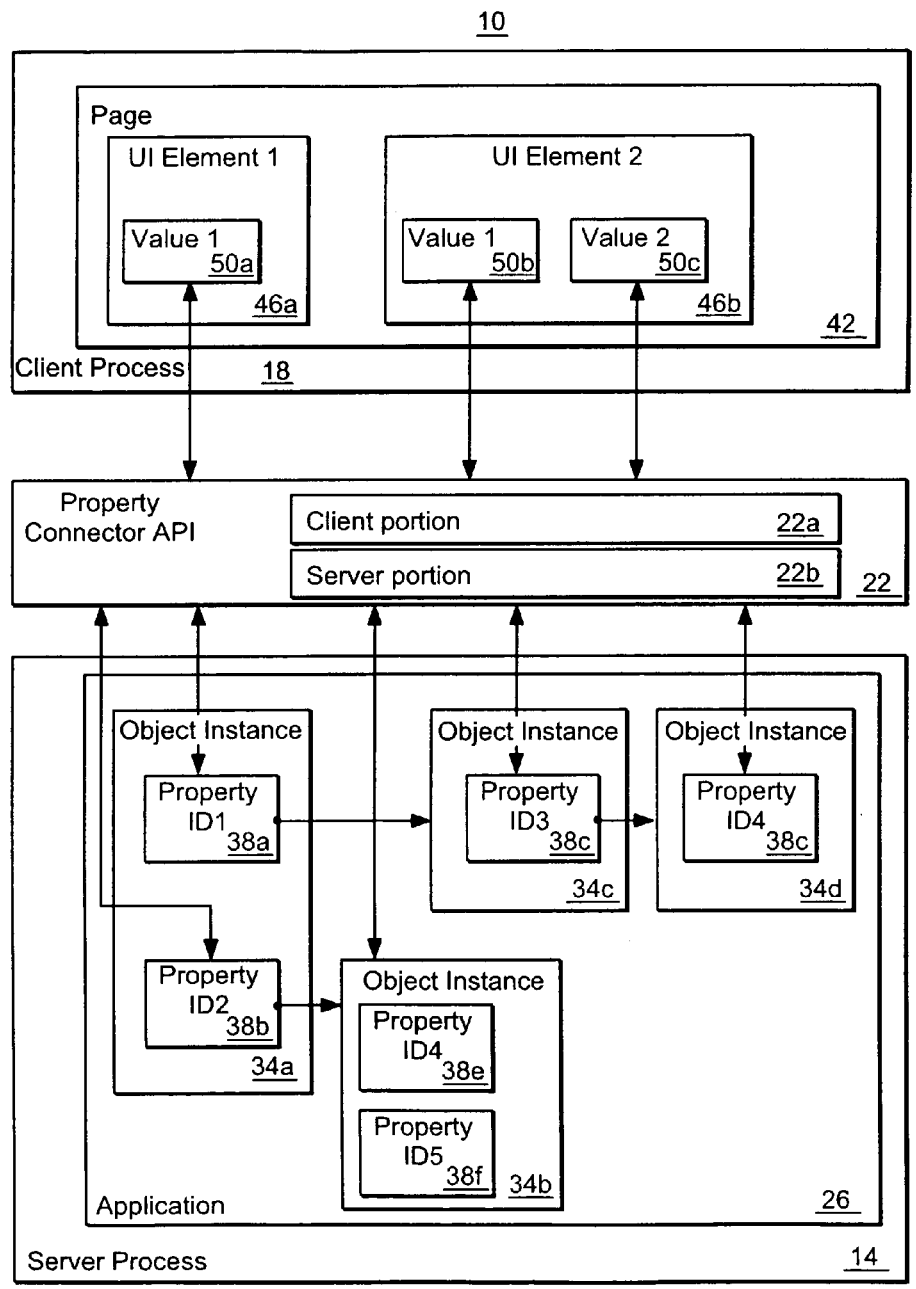
FIG. 1 is a block diagram of an embodiment of property path associations constructed in accordance with the invention.

FIG. 1 depicts a block diagram of an embodiment of a system 10 for communicating changes between a user-interface and an executing application, using property paths.

The system 10 includes a server process 14, a client process 18 and a property connector API 22. The server process 14, the client process 18 and the property connector API 22 can be located on a single computing device or distributed among several computing devices. The server process 14 includes an application 26 with application components 34a, 34b, 34c and 34d (generally 34). In this embodiment, the application components 34a, 34b, 34c and 34d are instances of objects that the application 26 generates.

Each of the application components 34a, 34b, 34c and 34d includes zero or more properties Ace 38a, 38b, 38c, 38d, 38e and 38f (generally 38). This embodiment includes two types of properties. A first type of properties 38, for example, 38d, 38e and 38f, have a value for a specific variable. A second type of properties 38, for example, 38a, 38b and 38c, have a pointer to another application component 34 (e.g., object, class), thus this second type of property 38 represents a composite of additional application components 34 and their properties 38. In other embodiments, application components 34 can be generated by a process using a data file. For example, application components 34 can be representations of nodes within a structured data file, such as XML or a database, where the properties 38 are attributes specified in the structured file or associated document type definition ("DTD") (i.e., a specific definition that follows the rules of the Standard Generalized Markup Language). In another embodiment, the application components 34 support additional standard properties 38 such as 'parent', 'child[i]', and the like.

Many applications 26 are object-oriented and as such, generate a structured relationship between the objects 34. The structured relationship can be illustrated as a node tree. The root node is the first object of the application and each object that the root object points to becomes a child node. Each object that the child node points to becomes a grandchild node and so on. For example, object 34a represents a root node. Objects 34b and 34c are children nodes of the root node 34a. Object 34d is the child node of object 34c and the grandchild node of object 34a. Each part of the application 26 state (i.e., values of application component properties 38 at a particular instant in time) is accessible via a traversal of a 'path' from one or more root objects to the state of a property itself by following object pointers (e.g., properties 38a, 38b, 38c). This path taken by the traversal of the structured relationship is a property path, also referred to as a pathname, and is described in more detail below. An object and/or property may be addressable by several 'paths' from the root node, for example, an object representing an Employee may be accessible as 'the current employee' (root->current), the $10^{th}$ employee in an index (root->index->item 10), the manager of some other employee (root-> . . . ->manager) and the like. These paths correspond to different concepts that happen to have the same object as their current value.

Some models for application development (e.g., JAVA-BEANS™ component architecture by Sun Microsystems, Inc. of Palo Alto, Calif. and ACTIVEX™ platform by Microsoft Corporation, Redmond, Wash.) provide a link between the application components 34 of an application 26 by using a property-based link. A property-based link is an object pointer that is accessible via a standard means (e.g., 'get' and 'set' methods). Applications 26 using property-based links undertake to inform the server process 14 about changes in the property-based link using, for example, property change events.

The client process 18 produces a user-interface ("UI") 42 that is displayed to a user. The UI 42 includes one or more user-interface elements 46a and 46b (generally 46). The UI 42 can be, for example, a Web page, an HTML document, a custom UI and the like. Though the UI is generally hereinafter referred to as a page 42, this should be without loss of generality as the UI 42 can be displayed on a non-Web client using a native language. The UI elements 46 are associated with one or more values 50a, 50b, 50c (generally 50) that the UI elements 46 display or make decisions in response thereto. The user-interface element 46 is a portion of the UI 42 that dynamically changes and is associated with a state of property 38 of an application component 34. As described in more detail with FIG. 4, a user of the page 42 associates each of the UI elements 46 to the one or more properties 38 of an application component 34 by indicating one or more property paths. The UI element 46 can be, for example, an input box for textual or numerical input and display of a value of a property 38. The UI element 46 also can be, for example, a horizontal slider for numerical input and display of a value of a property 38. As shown, the first user-interface element 46a displays and/or affects a value 50a associated with a state of a property 38 of one of the application components 34. The second user-interface element 46b displays and/or affects two values 50b and 50c.

Between the application components 34 and the user-interface elements 46 is the property connector API 22. The property connector API 22 includes a client portion 22a and a server portion 22b. The property connector API 22, and thus the client portion 22a and the server portion 22b, is a process that is independent of the application 26 (i.e., not a part of nor generated from the application 26). The property connector API 22 process can be implemented as software, as hardware or as a combination of both. The execution of the property connector API 22 can be initiated in several ways. A computing device on which the property connector API 22 resides can initiate execution of the property connector API 22 upon power up or upon a authorized user log-in. The computing device can initiate execution of the property connector API 22 when the computing device downloads a page 42 containing UI elements 46 associated with property paths. The computing device can initiate execution of the property connector API 22 when the user initiates execution of the application 26 or requests delivery of the page 42. In one embodiment, when the computing device initiates execution of the property connector API 22, the computing device also receives a startup argument including the name of a file containing the UI page 42 details, and details of the server node 60 to connect to and the application 26 to start.

As explained in more detail below, the property connector API 22 maps each dynamic user-interface element 46 to a property 38 of an application component 34 using the associated property path. The property path defines the interaction between the client process 18 and the server process 14 in terms of properties 38 of the application 26 rather than in terms of the user-interface elements 46.

In its mapping, the property connector API 22 represents a property 38 of an application component 34 within an application 26 as a property path. The property path is the concatenation of one or more identifiers. An identifier corresponds to a property 38 within an application component, which can be a value or a pointer. The property path defines a path through the application 26 from a root component 38 to the particular application component 34, and a property 38 itself of that application component. For example, property 38a points to application component 34c and the property 38c of application component 34c points to application component 34d that contains property 38d. The property path that corresponds to the property 38d in this example is 'App.PropertyID1.PropertyID3.PropertyID4'.

Each part of the property path (i.e., App, PropertyID1, PropertyID3, PropertyID4) is an identifier. The property connector API 22 uses these identifiers to traverse the path in the application 26 defined by the property path. The 'App' identifier identifies the root node. The 'identifies the property 38a within the root component 34a and property 38a points to application component 34c. The property connector API 22 determines the value of 'PropertyID1' by obtaining the present state (i.e., value) of a property with the same name within the root component of the application 26 identified by 'App'. For example, the property connector API 22 determines the value by using a 'get' method of an API for the application 26. The property connector API 22 determines the present state points to the application component 34c. Because the value of property corresponding to identifier 'PropertyID1' is component 34c, the 'PropertyID3' identifier identifies the property 38c within the component 34c. The property connector API 22 determines the value of 'PropertyID3' by obtaining the present state (i.e., value) of the property 38c with the same name within the component 34c, which was identified using 'PropertyID1', The property connector API 22 determines the present state points to the application component 34d. Because the value of property corresponding to identifier 'PropertyID3' is component 34d, the 'PropertyID4' identifier identifies the property 38d within the component 34d. The property connector API 22 determines the value of 'PropertyID4' by obtaining the present state (i.e., value) of the property 38d with the same name within the component 34d, which was identified using 'PropertyID3'. Property 38d is not a pointer, but a number, for example, salary. The property connector API 22 maps the current state of this property 38d to the property path 'App.PropertyID1.PropertyID3.PropertyID4'. While mapped, the property path 'App.PropertyID1.PropertyID3.PropertyID4' has the value of the salary of property 38d.

Property paths are not "wired" connections from a user-interface element 46 to the associated application component 34, but more analogous to a description of what 'type' of data the user-interface can display and/or affect (i.e., a loosely coupled, flexible connection). This means that during execution, the application 26 can create or delete application components 38 without any adverse affect on the user-interface elements 46. For example, the property path 'App.PropertyID1.PropertyID3.PropertyID4' corresponds, at one point in time, to property 38d, as stated above. However, if the application 26 changed property 38c, 'PropertyID3', to subsequently point to application component 34b, instead of application component 34d, the property path 'App.PropertyID1.PropertyID3.PropertyID4' subsequently corresponds to property 38e, not property 38d. When notified of the change, the property connector API 22 updates the value 50 of the user-interface element 46 associated with the property path 'App.PropertyID1.PropertyID3.PropertyID4' to reflect the current state of property 38e.

In another example, for a human resources application, the property path to the "salary" property of the twenty-seventh employee in a list of employees of a certain department is 'HRApp.Dept.Employee[26].Salary' (counting from 0). The property path describes an abstract property of the application 26 as a whole, not a specific property of a particular instantiated object. In other words, if the user-interface element 46 was to be associated with a specific property, then the path could be simply, for example, 'property 38d'. Then regardless of which components 34 pointed to which other components 34 would not matter, because the property path would always reflect the state of property 38d. This, however, is not how property paths work. The property path identifies a path through the application 26 and not one specific property 38d located in the application 26. The path can change as one of the properties 38 corresponding to one of the identifiers in the concatenation changes. When a component 34 changes and points to a different component, the property path follows that change and the property path reflects the state of the new property the path now ends at.

Similarly, a property path can also represent a property with a potential to exist, but that does not exist at the present time. For example, if the list of employees only contains twenty-six employees (numbered 0 to 25), the property path 'HRApp.Dept.Employee[26].Salary' does not correspond to any property. When another employee is added, the property path 'HRApp.Dept.Employee[26].Salary' would then point to the salary property of the twenty-seventh employee. This example illustrates how property paths can be used to describe properties that do not exist presently, but can exist in the future, in addition to those properties that exist only at application startup, or at some other well defined point. In the human resources application example, this means that as the list of employees change, the actual employee who is twenty-seventh in the list of employees can change, but the property path remains pointing to the salary property of the twenty-seventh employee, regardless of who that may be. This method of using the structured relationship between application components 34 to create a property path is important in allowing strong separation between UI elements 46 and application components 34.

Figure 6:
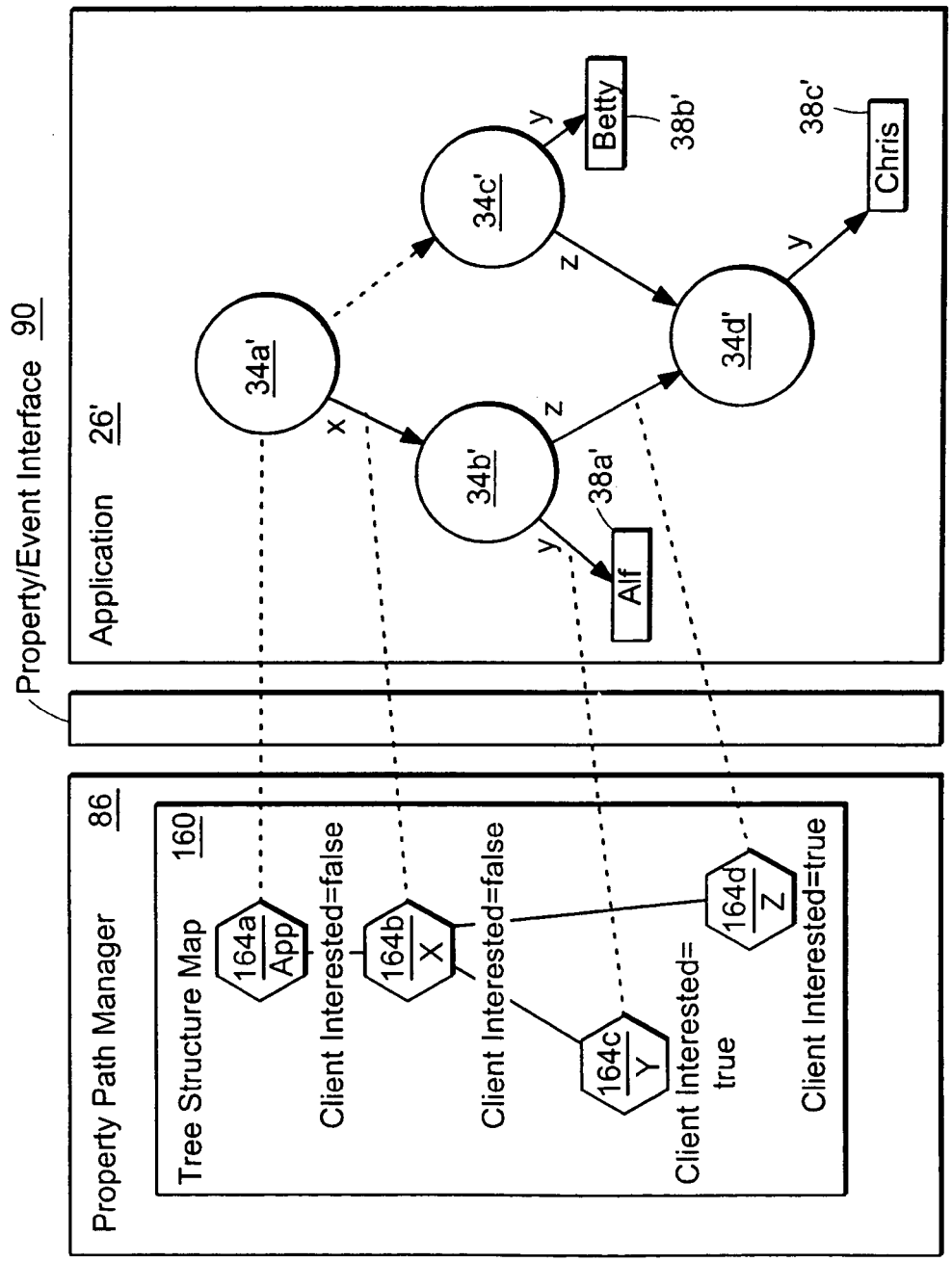
FIG. 6 is a block diagram of an embodiment of the mapping of registered property paths of the invention.

Using this example in connection with FIG. 1, the second value 50c of UI element 46b displays the salary of the twenty-seventh employee of a specific department because the value 50c is associated with the property path 'HRApp.Dept.Employee[26].Salary'. The client portion 22a maps this association between the value 50 and the property path. The server portion 22b maps the same property path 'HRApp.Dept.Employee[26].Salary' to the property 38d of application component 34d. To obtain this mapping, the server portion 22b follows the pointers with the application components 34 that correspond to the property path. In one embodiment, the server portion 22b follows the pointers by using 'get' methods and constructing a structure tree map 160 (FIG. 6).

The 'HRApp' portion of the property path corresponds to the application 26 and the first created application component 34a (i.e., the root application component). The 'Dept' portion of the property path corresponds to the property 38a that points to the application component 34c, which in this example represents a list of employees of the indicated department. The 'Employee[26]' portion of the property path corresponds to the property 38c that points to the Ads application component 34d, which in this example represents information about the twenty-seventh employee. The 'Salary' portion of the property path corresponds to the property 38d that contains a value, which in this example represents the amount of the salary of the twenty-seventh employee. The application component 34d can also contain other properties (not shown) that have values representing information about that particular employee, such as name, social security number, date of hire and the like.

As the list of employees for the indicated department changes, the property 38c that pointed to application component 34d changes and subsequently points to another application component (not shown). In this example, before the change, the application component 34d represented information about the twenty-seventh employee. After the change, the new application component (not shown) to which the property 38c points now represents the new twenty-seventh employee. But even with the change, the property path 'HRApp.Dept.Employee[26].Salary' still points to the twenty-seventh employee of the indicated department and thus the second value 50c of UI element 46b displays the appropriate value of the salary of the new twenty-seventh employee, whoever that employee may now be.

The following are additional examples of property paths. For example, the property path 'App.CurrentSelection.Price' represents the price property 38 of the currently selected item within a shopping application 26. If no item is selected or the current selection changes, then the value 50 of this property 38 changes, even though the price property 38 of each of the individual items 34 (e.g., objects) within the application 26 does not. For another example, the property path 'App.SelectedEmployee.Boss.Boss.Name' represents the name property 38 of the selected employee's boss's boss. This property path will display the appropriate value 50 even if the selection changes (e.g., a different employee is selected), if there is a reorganization, or if the boss changes his/her name. In another example, the property path 'App.Employee[21].Name' represents the name property 38 of the twenty-second employee in a table. If the table is sorted or changes size, then this property path will correctly reflect the name property 38 of the employee who is, after the revision, currently the twenty-second employee in the table.

Figure 2:
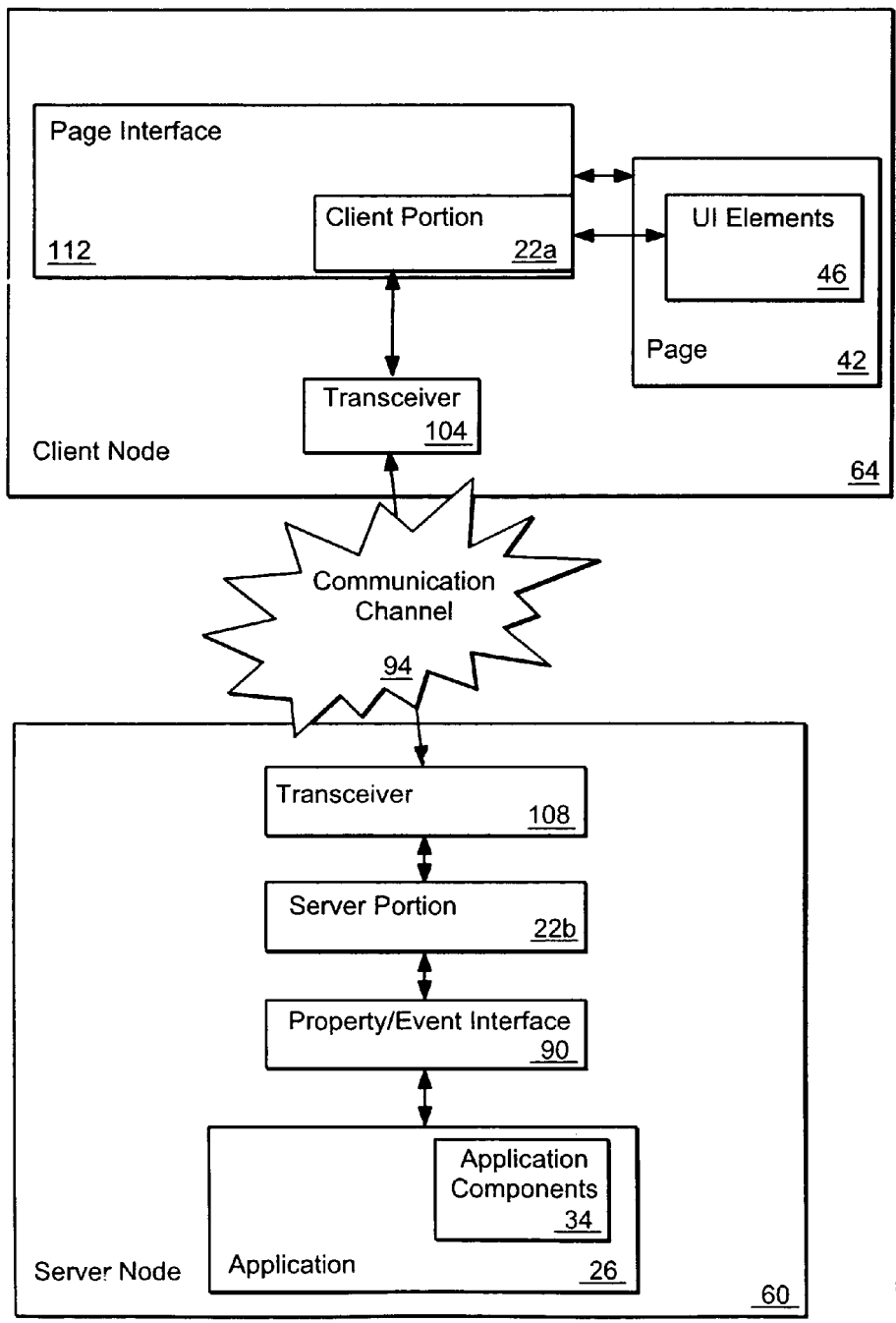
FIG. 2 is a block diagram of an embodiment of the sub-components of the property connector API of FIG. 1 constructed in accordance with the invention.

FIG. 2 illustrates an exemplary embodiment of a system 54 that includes a first computing system ("server node") 60 in communication with a second computing system ("client node") 64 over a communication channel 94. For example, the communication channel 94 can be over a local-area network (LAN), such as a company Intranet, or a wide area network (WAN) such as the Internet or the World Wide Web. The server node 60 includes a server transceiver 108, the server portion 22b, a property/event interface 90 and the application 26, including one or more application components 34. The server node 60 can establish communication over the communication channel 94 using a variety of communication protocols (e.g., ICA, HTTP TCP/IP, IPX, SPX, NetBIOS, Ethernet, RS232, and direct asynchronous connections). As shown, the server portion 22b is a separate process on the server node 60. In other embodiments, the server portion 22b, or portions thereof, is located on a server node (not shown) separate from the application program 26. In another embodiment, the property/event interface 90 is included as part of the server portion 22b.

The client node 64 includes a client transceiver 104 and an optional page interface 112. The page interface 112 includes the client portion 22a and generates (or edits) a page 42, containing dynamic UI elements 46. The client node 64 can be any computing device (e.g., a personal computer, set top box, phone, handheld device, kiosk, etc) used to provide a user-interface 42. The client node 64 can be connected to the communication channel 94 through a variety of connections including standard telephone lines, LAN or WAN links (e.g., T1, T3, 56 kb, X0.25), broadband connections (ISDN, Frame Relay, ATM), and wireless connections. As shown, the client portion 22a is part of the page interface 112. The page interface 112 can be, for example, a Web browser (e.g., a MICROSOFT™ INTERNET EXPLORER browser manufactured by Microsoft Corporation of Redmond, Wash. and/or a NETSCAPE™ NAVIGATOR browser, manufactured by Netscape Communications Corporation of Mountain View, Calif.). In another embodiment, for example, one without a page interface 112, the client portion 22*a* is a separate process on the client node 64.

Figure 3:
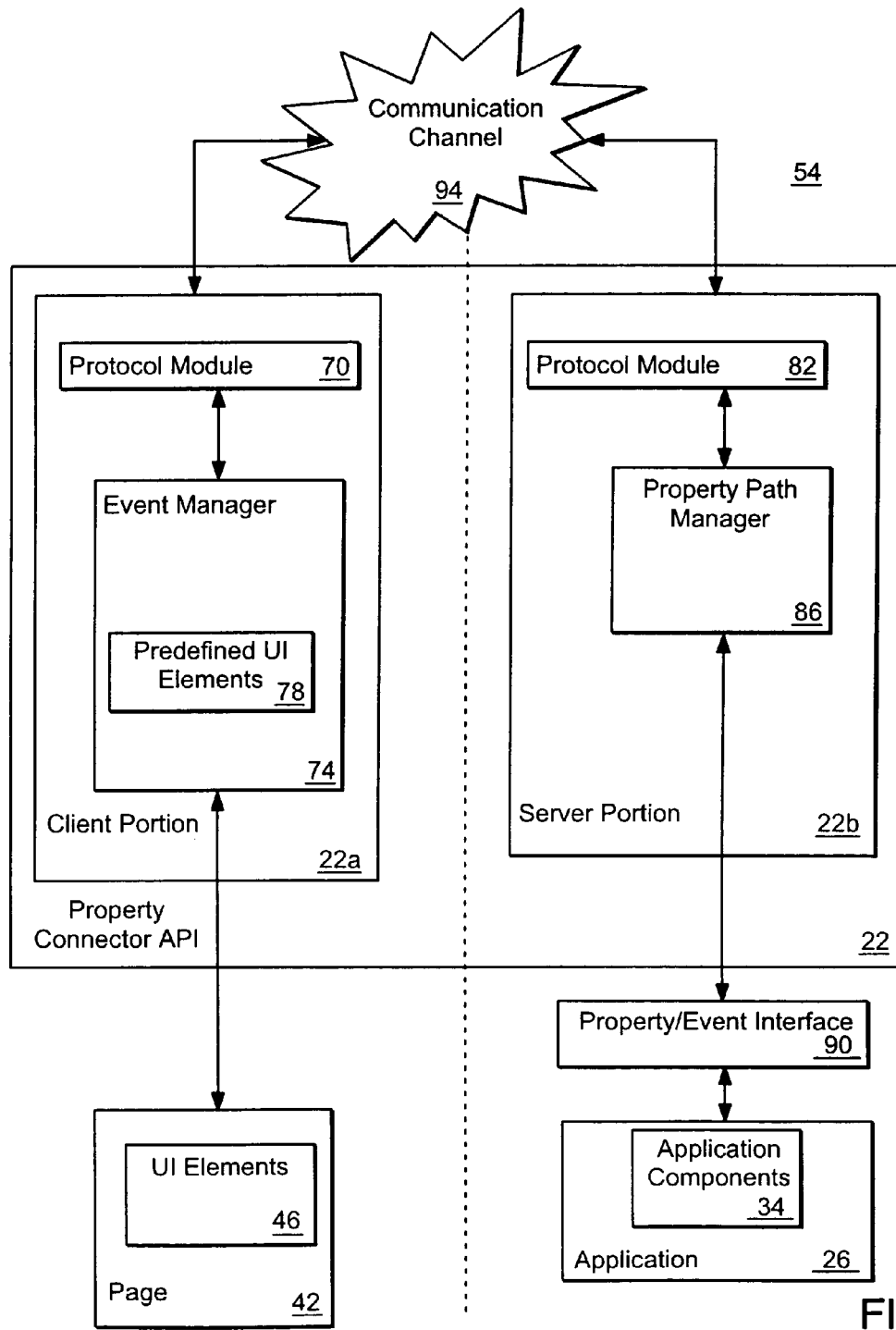
FIG. 3 is a block diagram of another embodiment of the system architecture of the invention.

In other embodiments, interaction between the client node 64 and the server node 60 occurs if the application 26 is executing and the user is interacting, via the page 42, with the application 26 (i.e., run time). If the user is creating a page 42 (i.e., build time), then there is no interaction between the client node 64 and the server node 60. For example, the user creates a page 42 using the page interface 112 (e.g., HTML editor, DREAMWEAVER™ software by Macromedia, Inc. of San Francisco, Calif.), as described in more detail with relation to FIG. 4. The user locates UI elements 46 using the page interface 112. In one embodiment, the user selects a UI element 46 from a set of predefined UI elements 78 (FIG. 3). The user associates a property path with the selected UI element 46. In one embodiment, a property file has the following form:

```
---start property file--
// List of types used in this property files (identifiers)
// String and Number are built in
Types:
Person
Company
// Identify the type of the root object
RootType: Company
// List the properties. Of the format
// <type of object>.<name of property><type of property>
// or
// <type of object>.<name of property>[] <type of property>
// (for indexed properties)
// A RW on the end of the line indicates they property is read/write
//
// May contain multiple entries for a certain object, property pair
// if the property can have several types.
// Any property may also be undefined
Properties:
Company.Name String
Company.Boss Person
Company.Staff[] Person
Company.EBW[] Person
Company.SalaryTotal Number
Person.Name String
Person.Salary Number RW
Person.ID String
Person.Boss Person
Person.Staff[] Person
// List of methods that may be called from the client
// in format <object type>.<method name>(<argument type...>)
Methods:
// Hire someone given name, id, salary, boss
App.Hire(String, String, Number, Person)
// Fire someone
Person.Fire( )
---end property file---
```

In another embodiment, the property file has the following form:
--- start property file---
RootType: Company
Company.Name String
Company.Boss Person
Company.Staff[] Person
Company.EBW[] Person
Company.SalaryTotal Number
Person.Name String
Person.Salary Number RW
Person.ID String
Person.Boss Person
Person.Staff[] Person
App.Hire(String, String, Number, Person)
Person.Fire( )
---end property file---

In one embodiment, the property file containing property paths is stored on the client node 64 for the page interface 112 to access. The property file can contain the types of application components 34 that the application 26 creates and the type of properties 38 that each of the type of application components 34 contain. The property file can also contain information regarding the structured relationship between application components 34 and/or the children application components 34 of each type of application component 34. The file can be manually created and/or manually augmented.

In other embodiments, the page interface 112 and/or the client portion 22*a* has a property browser. In one embodiment, the browser may examine the code of the application 26 (e.g., JAVA™ compatible classes or source code) and determine possible property paths by examining the type of the get/set property methods. In another embodiment the property browser temporarily communicates with the server node 60 and initiates execution of the application 26. Upon execution, the property browser can obtain the instantaneous values of available application components 34, their properties 38 and the relationship (e.g., child nodes) between the application components 34. After this information is obtained, the execution of the application 26 and communication between the client node 64 and server node are terminated. The property browser can save the obtained results in the property file.

FIG. 3 depicts the client portion 22*a* and the server portion 22*b* of the property connector API 22 in more detail. The client portion 22*a* includes a protocol module 70 and an event manager 74. In another embodiment, the protocol module 70 is located within the client transceiver 104 (e.g., FIG. 2). As shown, the client portion 22*b* also includes an optional predefined UI elements portion 78, which contains data to generate specific types of UI elements 46, identified in detail below, in connection with FIG. 4. The client portion 22*a* communicates with the UI elements 46 of the page 42.

The server portion 22*b* includes a protocol module 82 and a property path manager 86. In another embodiment, the protocol module 82 is located within the server transceiver 108 (e.g., FIG. 2). The server portion 22*b* is in communication with the application components 34 of the application 26 through a property/event interface 90. The client portion 22*a* and the server portion 22*b* communicate with each other over the communication channel 94, using a property path protocol as described below. In another embodiment, as shown in FIG. 1, the client portion 22*a* and the server portion 22*b* are located on the same machine and are directly connected to each other.

The property connector API 22 associates the user-interface elements 46 with the application components 34 using property paths as described above. In overview, the functions of the property connector API 22 can include:

(1) collecting and disseminating change events, (a) for the user-interface elements 46 associated with the properties 38, (b) between the user-interface elements 46 and the server node 60;

(2) communicating change events of particular properties 54 between the client node 64 and the server node 60, and tracking those change events about which the client node 64 needs to be informed;

(3) dynamically binding property paths to specific application components 34 (e.g., objects) within the application 26, reacting to changes in application components 34 along the property path, and rebuilding the path as appropriate when instances of application components 34 are created or deleted; and (4) collecting events from, and communicating property changes to, individual application components 34.

Anyone one or a combination of any of these functions can be performed by the event manager 74, the property path manager 86, the property/event interface 90 and the protocol modules 70 and 82.

During operation of the system 54, the server node 60 executes the application 26 and instantiates the application components 34 (e.g., objects). In one embodiment, for example, the application 26 is written in JAVA™ compatible source code, the application components 34 are JAVA-BEANS™ compatible components and the property/event interface 90 includes a JAVABEANS™ compatible API. If not already executing, the server node 60 also executes the server portion 22b, which is independent of the application 26 (i.e., not a part of nor generated from the application 26). The server node 60 executes the server portion 22b in response to the client node 64 requesting execution of the application 26 and/or in response to the client node 64 requesting the page 42 associated with the application 26. If not already executing, the client node 64 executes the client portion 22a, which is independent of the application 26 (i.e., not a part of nor generated from the application 26). In one embodiment, for example, the event manager 74 of the client portion 22a is written as a set of JAVASCRIPT™ files for a MICROSOFT™ INTERNET EXPLORER browser manufactured by Microsoft Corporation of Redmond, Wash. and/or a NETSCAPE™ NAVIGATOR browser, manufactured by Netscape Communications Corporation of Mountain View, Calif. The client node 64 executes the client portion 22a in response to a user requesting execution of the application 26 and/or in response to the user requesting the page 42 associated with the application 26.

The client-side event manager 74 maps the UI elements 46 to the associated property paths. The event manager 74 maintains a database of the mapping of UI elements 46 to property paths. The event manager 74 may or may not examine the individual identifiers in the concatenation of a property path. This affects the amount of information that has to be transmitted between the client portion 22a and the server portion 22b. In one embodiment, the event manager 74 treats property paths as opaque names. In this embodiment, the event manager 74 does not breakup or examine the individual identifiers in the concatenation of a property path, but instead treats the property path as a single, long variable name or as a placeholder. This allows a compression algorithm in the protocol between the client portion 22a and the server portion 22b that replaces each property path in the page 42 with a single id (e.g., $1). In this embodiment, there is a dictionary (not shown) on the server node 60 so the sever portion 22b can lookup each id and convert the id into a property path prior to accessing the corresponding property. In this Ads embodiment, the server portion 22b must track all changes to any of the properties corresponding to identifiers in the property path and determine how those changes affect the value of the one or more property paths including the identifier. The server portion 22b also only communicates changes to the client portion 22a in terms of complete property paths.

In another embodiment, the client portion does examine changes corresponding to each individual identifier in the property path and can determine itself how a change to a property corresponding to a single identifier affects one or more property paths including that identifier. In one embodiment, for example, a copy of the property path manager 86 is located on the client node 64 and sends all changes (rather than just the changes in leaf values) in a tree structure 160 (FIG. 6) between the client portion 22a and the server portion 22b. This embodiment adds complexity to the system 54, but may give bandwidth/performance gains, because the server node 22b can communicate changes to the client portion 22a in terms of individual identifiers. For example, consider an indexed property A with A[0]=X, A[1]=Y and A[2]=Z and each of X, Y, and Z application components 34 with three properties 38a, b, and c. If the table is resorted so that A[0]=Y A[1]=Z and A[2]=X, in the system 54 (FIG. 3), nine property change events are sent from server portion 22b to the client portion 22a (i.e., one each for the properties A[0].a, A[0].b, A[0].c, A[1].a, A[1].b, A[1].c, A[2].a, A[2].b, and A[2].c). In the copy of the property path manager 86 is located on the client node 64, the server portion 22b sends three property change events (i.e., A[0], A[1] and A[2]), to the client portion 22a because the copy of the property path manager 86 on the client node 64 has all of the children node information and can make the applicable changes.

As depicted in FIG. 3, the event manager 74 sends to the server-side property path manager 86 all of those property paths in which the event manager 74 has interest. The event manager 74 registers interest in a property path using, for example, a 'ListenTo' command shown in Table 1. When the event manager 74 informs the server portion 22b about which property paths are of interest, the event manager 74 does not need to inform the server portion 22b specifically which (or how many) UI elements 46 are interested in each property path. The property path manager 86 monitors the properties 38 of the application components 34 corresponding to the identified property paths and notifies the event manager 74 when any of the property paths in which the client portion 22b has registered interest in changes. When the user provides some input, by interacting with one of the user-interface elements 46, the event manager 74 notifies the property path manager 86 about the change and to which property path the change corresponds. Because the communication references property paths, the communication about the change is in terms of the effect on the application components 34, rather than in terms of the user-interface elements 46. For example, if the user slides a horizontal slider to the 50% point, the UI element determines the value the 50% point represents and signals an event to the event manager 74.

When a property path is no longer of interest, the event manager 74 can send a notice of lack of interest to the server portion 22b in one of several different ways. For example, the event manager 74 can immediately inform the server portion 22b, not inform the server portion 22 at all, or inform the server portion 22b after some time period or other event (e.g., when first notified about a change in the corresponding property of the property path). The server portion 22b transmits to the client portion 22a any change events associated with those property paths in which the client portion 22a has indicated interest. When the event manager 74 receives a property change event for a change in the state (e.g., value) of a property 38 associated with a property path from the server portion 22b, the event manager 74 determines, using the mapping, which UI elements 46 must be notified. The event manager 74 communicates the updates due to the change event to each of the UI elements 46 mapped to the property path. In one embodiment, there are multiple pages 42 located in separate sub-windows. The event manager 74 is configured to inform UI elements 46 that are located in other sub-windows about any applicable changes. In this embodiment, the event manager 74 manages the database of the mapping so that the closure of a window does not adversely affect the other UI elements 46. In this embodiment, the event manager 74 and/or associated data structures may be replicated or distributed between the different pages. For example, each page may contain a portion of the event manager 74, and a table of UI elements 46 that are present on that page.

If the user updates a UI element 46, the UI element 46 signals a change event to the event manager 74 and is updated on the display as the user makes a change. When the event manager 74 receives a change event from the UI element 46, the event manager 74 determines, using the mapping, which other UI elements 46 are mapped to the same property path as the UI element 46 that changed. The event manager 74 communicates the updates due to the change event to each of the other UI elements 46 mapped to the same property path. The event manager 74 also sends a change event to the server portion 22*b* so that the server portion 22*b* can update the associated property 38 of the application component 34 in response to the user change of the UI element 46.

In another embodiment, the event manager 74 does not make any immediate changes to the UI element 46 that the user changes or any other UI elements 46 mapped to the same property path. Instead, the event manager 74 first sends a change event to the server portion 22*b* so that the server portion 22*b* can update the associated property 38 of the application component 34 in response to the user change of the UI element 46. The application 26 can reject the change initiated by the user for security or other reasons. The event manager 74 waits until the server portion 22*b* sends back a change event indicating that the property 38 of the application component 34 associated with the property path has changed. After the event manager receives that change event from the server portion 22*b*, then the event manager 74 communicates the updates due to the change event to each of the other UI elements 46 mapped to the same property path. If the application rejects the change, then the event manager 74 updates the UI element 46 that the user changed back to its pre-user intervention state.

In some embodiments, the property connector API 22 takes steps to avoid looping of change events, which can result in trying to update a UI element 46 or an application component 34 that generated the change event and has already been updated. For example a UI element 46 only generates a change event if a user updates the UI element 46, for example, but does not generate a change event if the event manager 74 updates the UI element 46. In another embodiment, for example, the property connector API 22 does not inform the original generator (i.e., UI element 46, application component 34) of the change event, as that originator is already updated.

A page 42 can also be altered dynamically when, for example, an iterator type predefined UI element 78 creates additional UI elements for indexed properties, a process described in more detail below. If a page 42 is being altered dynamically, then when a UI element 46 is generated, the event manager 76 determines those property paths in which the UI element 46 is interested. Similarly, when a UI element 46 is destroyed, the event manager 74 determines that the UI element 46 is no longer interested in those property paths. In one embodiment, the user has previously created the page 42 separately (i.e., at build time) and thus some or all of the UI elements 46 on the page 42 are created prior to the application 26 executing. In an embodiment using treeview type or iterator type predefined UI elements 78, an example of a portion of the UI (e.g., a row in the table) is included in the page 42 at build time. At runtime, the client portion 22*a* duplicates/clones the example (e.g., row) for all of the members of the indexed property associated with the treeview type or iterator type predefined UI element 78, as described in more detail below. The example portion of the UI may be a single UI element or a more complex set of UI elements.

Figure 4:
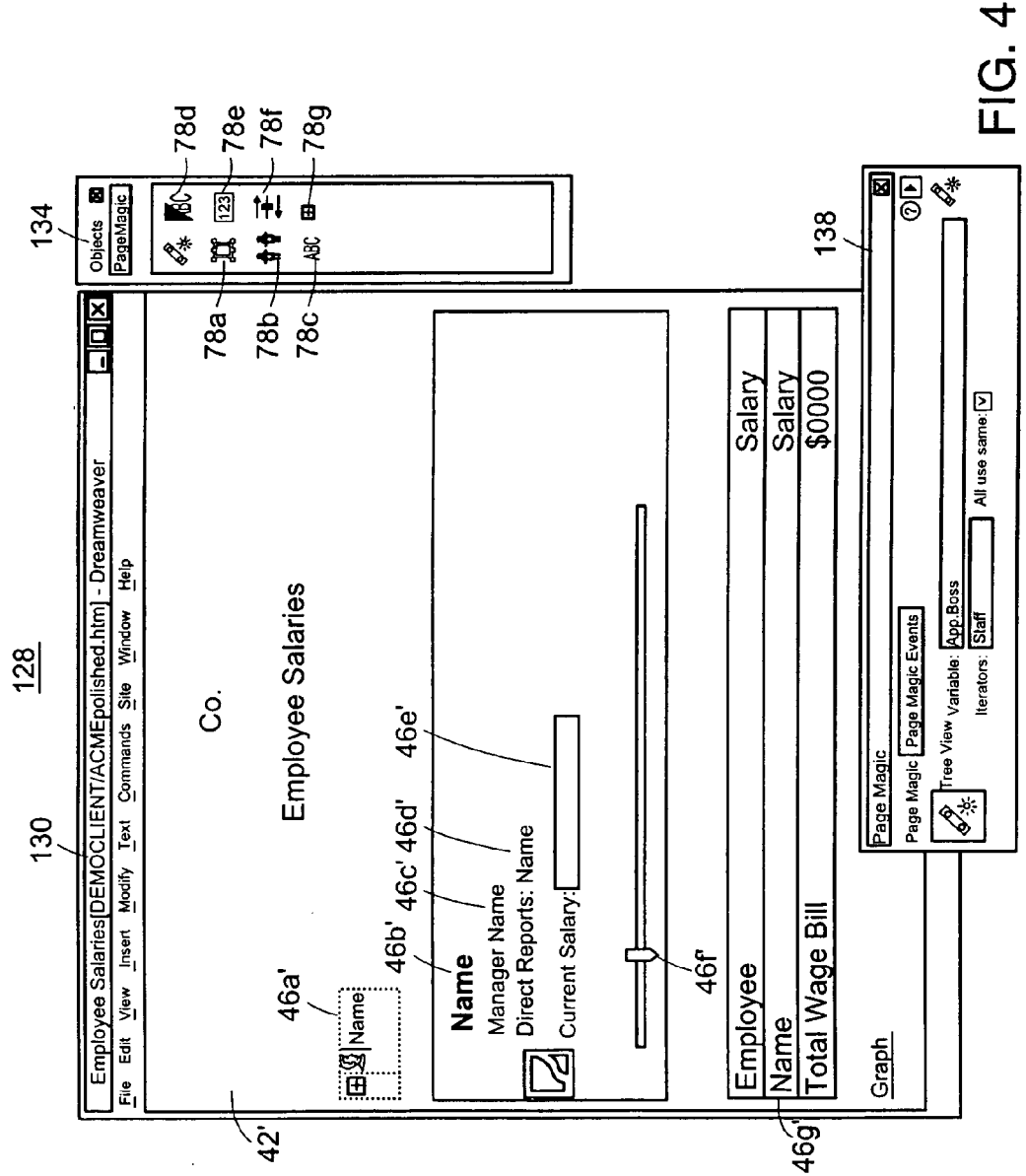
FIG. 4 is a screenshot of a UI development application that is being executed in combination with an embodiment of the client portion of the invention.

FIG. 4 depicts an embodiment of a screenshot 128 produced by the page interface 112 (FIG. 2) (e.g., an HTML editor) that helps a user generate a UI 42' at build time according to the invention. The screenshot 128 includes a display 130 of an HTML page 42' that a user is generating with the page interface 112. The screenshot also includes a palette 134 of some available predefined UI elements 78 (FIG. 2) and an entry display 138 for assigning a property path to a UI element 46'.

The palette 134 of available predefined UI elements 78 includes predefined UI elements 78*a*, 78*b*, 78*c*, 78*d*, 78*e*, 78*f* and 78*g*. Predefined UI element 78*a* represents an image type UI element. The image type predefined UI element 78*b* displays an image dependent on the value of the associated property (e.g., 'property-value'.gif). Predefined UI element 78*b* represents an iterator type UI element. An iterator type repeats a UI element for each member of a range of indexed properties (e.g., once each for i=0, i+1, i=2, . . . in App. Staff[i]). The element 46*g'* represents an iterator type element, where the row 46*g'* is an exemplary row that the client portion 22*a* copies when dynamically creating elements for each index value.

Predefined UI element 78*c* represents a text type UI element. The text type predefined UI element 78*c* displays a property value as a piece of text. The elements 46*b'*, 46*c'* and 46*d'* represent text type elements. With a text type predefined UI element 78*c*, numeric values may be scaled, stepped and/or clipped. Predefined UI element 78*d* represents a hidden type UI element. A hidden type hides and shows part of the UI element, dependent on a property and an expression. Predefined UI element 78*e* represents a value type UI element. The value type predefined UI element 78*e* is an input box that displays a property value and allows it to be edited by a user. The element 46*e'* represents a value type element. Predefined UI element 78*f* represents a slider type UI element. The slider type predefined UI element 78*f* includes a vertical slider and/or a horizontal slider for numeric properties. The element 46*f'* represents a slider type element. When the user selects the slider type UI element, the user also enters values associated with 'min' 'max' and 'step' values for that slider element. In another embodiment, the user enters the property paths for the values associated with 'min' 'max' and 'step' values for that slider element and the properties corresponding to those property paths determine the associated values. Predefined UI element 78*g* represents a treeview type UI element. The element 46*a'* represents a treeview type element. The treeview type predefined UI element 78*g* is based on the levels of a property path. For example, for the property path 'App.Boss.Staff[i].Staff[j]' the treeview has a root level, a child level and a child's child level. The root level is App.Boss, the child level is App.Boss.Staff[i], and the child's child level is App.Boss.Staff[i].Staff[j].

In other embodiments, the palette 134 can include other predefined UI elements 78. For example, a button type disables a button based on a property value associated with a property path. An iframe type displays an embedded frame, where the contents of the frame are constructed from a page described by the value of property path. An anchor type creates an anchor which links to a page described by the value of a property path. The tab type predefined UI element displays associated properties as tabs, with one tab per member of a range of indexed properties. A flipflop type changes the style of part of a UI, dependent on a property and an expression. For example the flipflop will set the style of the part of the UI to one state (the flip state) if the expression evaluates to 'false' when a placeholder in the expression is substituted by the current value of the property. If the expression evaluates to 'true' then the style of the part of the UI is set to an alternative state (the flop state).

A deck type displays one of a 'deck' of portions of a UI, dependent on a property value (each UI portion is associated with a value, an the one whose value matches the current value of the property is displayed). A dropdown type is a nested dropdown menu, where each choice is a value from a range of indexed properties. A radio type has one or more radio buttons, where each has a property path and an associated value to set the property path to if the button is selected. All UI elements may contain an expression in terms of a number of property paths, rather than a simple property path. For example, the expression App.Employee[0].Salary+ App.Employee[1].Salary would use the sum of the value of these two properties to update the UI element, rather than an individual property value. A script type element executes a script on the client node 64 whenever a value of a specified property changes, and passes the value of the property as an argument to the script.

To create the HTML page 42', the user selects a UI element 46' generated by the page interface 112 and places the selected UI element 46' at the desired location in the page 42'. The user can also select from the predefined UI elements 78 shown in the palette 134. The user selects a predefined UI element 78 and places the selected predefined UI element 78 at the desired location in the page 42'. This placement can be done, for example by the click and drag method. Alternatively, the user can move the cursor to the desired insertion point, and then click on the item from the palette 134. The client portion 22a generates a dialog box that prompts the user to enter relevant attributes (e.g., property path, min/max values, etc). When the user enters all of the relevant attributes, the client portion 22a locates the selected element 78 at the cursor position.

The user uses the entry display 138 to edit a property path associated with a UI element 46' selected in the page 42'. To make the association, the user can type in the property path. In another embodiment, to make the association, the user can search through a list (e.g., structured tree) of available property paths for the application 26 and select a property path from the list. As described above, in one embodiment the list is provided through a property file containing identifiers and their relationships, and the page interface 112 accesses the property file, which is stored on the client node 64. In other embodiments, the page interface 112 and/or the client portion 22a includes a property browser. The property browser obtains the instantaneous values of available application components 34, their properties 38 (e.g., identifiers) and the relationship (e.g., child nodes) between the application components 34 and properties 38 to provide a list of available property paths. In another embodiment the property browser examines the code of the application and determines possible property paths by examining the types of the application objects.

Figure 5:
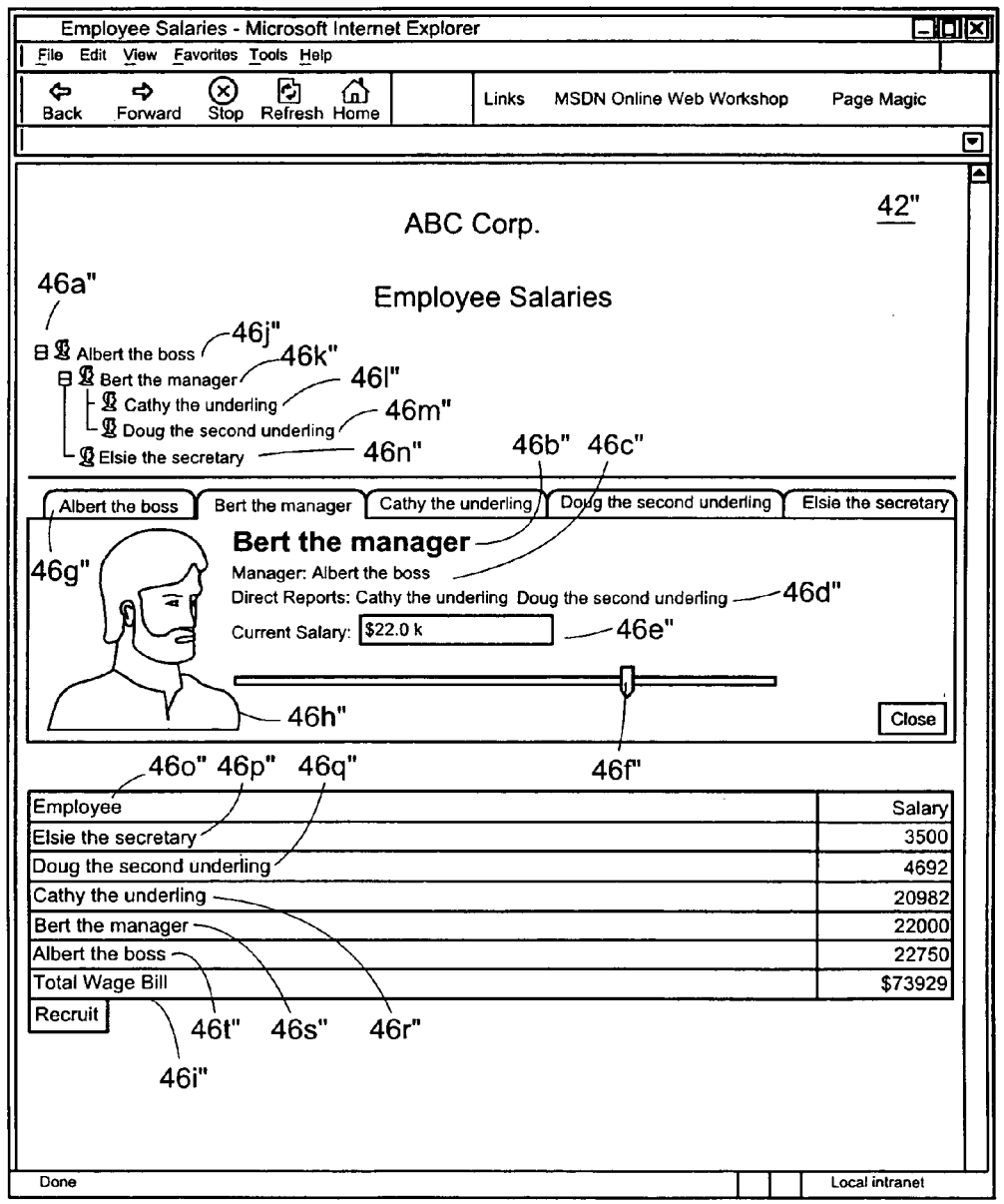
FIG. 5 is a screenshot of a UI application illustrating an embodiment of the invention during execution.

Once a user locates all desired UI elements 46' in the page 42' and associates them with property paths, the page 42' is ready to be used with the application 26. FIG. 5 depicts a screenshot 150 of a page 42" being used in conjunction with an executing application (i.e., run time). The page 42" contains a treeview type UI element 46a" that displays the structured relationship between the employees. The page 42" also contains a large number of text type UI elements. Text type UI elements 46b", 46c" and 46d" that display the text values of properties that correspond to the 'selected' employee. This current selection is also reflected in (and may be changed using) the tab type UI element 46g". Image type UI element 46h" displays an image that corresponds to the selected employee. The value type UI element 46e" (i.e., input box) and the slider type UI element 46f" display the salary that corresponds to the selected employee. The user can use any of the UI elements associated with the 'salary' property path (e.g., 46e", 46f") to change the salary that corresponds to the selected employee. As discussed above, when a user changes any one of these UI elements 46e", 46f", the client portion 22a changes all of the other UI elements 46" with the same property path so that they all stay consistent. This change to the UI elements 46" is done entirely on the client node 64 without any interaction from the server node 60. The client portion 22a also notifies the server portion 22b of the change, so the server portion 22b can update the appropriate property 38. However, the application 26 may veto the change either by not providing a 'set' method for the property 38, or by rejecting the call via veto means available in the property/event interface 90 (e.g., for JAVABEANS™ compatible components, this veto might be in the form of a "throw" statement using an "exception" sub-class). If the change is vetoed, the property path manager 86 informs the client portion 22a that the value has changed back to its old value, so that the correct value is displayed on the client node 64.

Other text type elements on the page 42" include 46j"–46n", which are all dynamically created by copying an example treeview entry 46a' (FIG. 4) and substituting in the appropriate property path for the position in the treeview (e.g., App.Boss.Name, App.Boss.Staff[0].Name, App. Boss.Staff[0].Staff[0] Name, App.Boss.Staff[0 ] .Staff[1] . Name, App.Boss.Staff[1] Name respectively). The client portion 22a similarly creates text elements 46o"–46t" in the table 46i" from an exemplary row of the table (e.g., 46g' of FIG. 4) and by substituting the index values 0, 1, 2, 3, and 4 into the indexed property path 'App.Employee[*]Name'.

FIG. 6 depicts a block diagram of an embodiment of a map of registered property paths generated by the property path manager 86. The property path manager 86 generates this map to track all of the property paths in which the client portion 22a registers interest and the properties 38 of the application components 34 to which the property paths correspond. In the embodiment shown, the map of the property path manager 86 is modeled as a tree structure 160. The tree structure 160 is associated with an application 26' including application components 34a', 34b', 34c', 34d' (generally 34'), some of which include properties 38a', 38b' 38c' (generally 38'). The tree nodes 164a, 164b, 164c, 164d (generally 164) of the tree 160 are associated with the root component 34a' and existing properties 38 of application components 34' within the application 26' if the appropriate application component 34' currently exists. If the property path does not currently refer to a valid application component 34', then the tree node 164 is not associated with any application component 34'. In another embodiment, the property path manager 86 generates a tree 160 representing all of the available property paths currently available for a specific application (not shown). In this embodiment, the property path manager 86 transmits all of the available property paths to the client portion 22*a* for use in generating a page 42", as mentioned with respect to FIG. 4.

As shown, the client portion 22*a* has registered interests in property paths 'App.X.Y' and 'App.X.Z', represented by tree nodes 164*c* and 164*d*, respectively. X, Y and Z represent properties of the application components 34' and these properties correspond to the identifiers of the property paths. For further illustration, property path 'App.X.Y' can represent the property path 'App.Employee[3].Name' and 'App.X.Z' can represent the property path 'App.Employee[3].Boss'. The initial value that corresponds to the property path 'App.Employee[3].Name' is represented by property 38*a'*, or the value 'Alf'. The application component that corresponds to the property path 'App.Employee[3].Boss' is represented by application component 34*d* ' and the name property of that application component is 38*c'*, or 'Chris'.

When the state of the application component 34' changes, the property/event interface 90 notifies the property path manager 86. The property path manager 86 updates the corresponding tree node(s) 164 in the property path tree 160. If the updated tree node(s) 164 represents a complete property path in which the client portion 22*a* has registered interest, the property path manager 86 sends, or queues for sending, a change event to the client portion 22*a*. The property path manager 86 subsequently recursively examines each of the tree node's children nodes. In this examination, the property path manger 86, via the property/event interface 90, obtains a new value of a property 38' from the application 26', and if another value of a registered property changes, transmits a change event to the client portion 22*a*. The results are that the change in the state of one property can result in many property change events being notified to the client portion 22*a*. The property path manager 86 terminates the recursive examination when something is found to be unchanged. For example, any child node of tree node 164*d* is not examined, as the value of the tree node 164*d* is unchanged.

In the embodiment shown in FIG. 6, the value of property path 'App.X' changes from application component 34*b'* to 34*c'*. In the 'App.Employee[3]' property path example, this change represents a change in the third employee. The client portion 22*a* is not interested in the 'App.X' property path, so the property path manager 86 does not generate a change event for this change. However, the client portion 22*a* registered interest in the property path 'App.X.Y', and the value of the property corresponding to that property path has now changed from 38*a'*, 'Alf', to 38*b'*, 'Betty'. The property path manager 86 determines this change when it recursively examines the children tree nodes Y 164*c* and Z 164*d* of tree node X 164*b*. Significantly, this recursive examining is what allows the property connector API 22 to maintain the loosely coupled connection between UI elements 46 and application components 34'.

For example, consider when the application 26' is not configured to generate a change event when the name of the third employee has changed, the value represented by the property path 'App.Employee[3].Name', but that the application 26' is configured to generate a change event when application components 34' are generated and/or deleted and when properties 38' of existing application components 34' change. The property path manager 86 converts those change events that the application 26' can generate into change events associated with property paths in which the client portion 22*a* has interest by examining its tree structure 160. Referring back to the change from application component 34*b'* to 34*c'*, both of these application components 34*b'*, 34*c'* point to application component 34*d* '. The client portion 22*a* has registered in the property path 'App.X.Z' and this value remains unchanged, despite that fact that App.X now refers to a different application component 34*c'*. In the 'App.Employee[3].Boss' property path example, this represents that the boss of the new third employee, represented by application component 34*c'*, is still the application component represented by 34*d'*. Because there is no change associated with the registered property path 'App.X.Z', the property path manager 86 does not generate a change event.

Because the property path manager 86 converts changes to states of a properties within an application 26' to change events associated with property paths, the client portion 22*a* can register interest in special type property paths. One special type is a cross-mapped property path. The cross-mapped property path is in the form, for example, Map ("v#r"). The cross-mapped special type represents a relationship between a value "v", specified with a property path, and a range of possible values "r", specified with a wildcard property path. The value of the cross-mapped property path is the property path within the range "r" that has the same value as "v". For example, if "v" is "Session.CurrentEmployee", "r" is "App.Employee[*]", and the currently selected employee is the $3^{rd}$ entry within the App.Employee enumeration then the value of Map ("Session.CurrentEmployee#App.Employee[*]") is 2.

Described another way, cross-mapping is a lookup of one property path, dependent on information from a second property path. For example, when the property path manager 86 receives the command Map ("Session.Current#App.Employee[*]"), the property path manager 86 examines the first property path "Session.Current" and determines the value v of the property path. The property path manager 86 then looks up the value v within the second property path, where the value v replaces a wildcard identifier of the second property path. The value of the cross-mapping is the index that matches. For example if the state of the first property path "Session.Current" is 'Barbara' and the corresponding states of the second indexed property paths are:
   App.Employee[0] is Abe
   App.Employee[1] is Barbara
   App.Employee[2] is Charlie
   App.Employee[3] is Diane, then the value of the cross-mapping "Session.Current#App.Employee[*]" is equal to 1

The second property path may contain several wildcards identifiers, and the value will be the 'route' through all of these wildcard identifiers. For example, for the cross mapping is "Session.Current#App.Boss.Staff[*].Staff[*]". The state mapped to the first property path is "Session.Current"=Ben. The corresponding states of the second indexed property are:
   App.Boss.Staff[0].Staff[0]=Alice
   App.Boss.Staff[0].Staff[1]=Ben
   App.Boss.Staff[1].Staff[0]=Chelsea.

The value of the cross-mapping of "Session.Current#App.Boss.Staff[*].Staff[*]" is equal to 0,1.

Another special type is an indexed property path. In the JAVABEAN™ compatible API, and other similar APIs, there is a concept of 'indexed' properties. The indexed property A acts like a number of properties 'A.size, A.0 A.1, A.2 ... A.(size-1)'. The property connector API 22 follows this indexing by representing such properties in property paths 'A[], A[0], A[1],A[2] ... A[size-1]', respectively. The iterator type predefined UI element 78 (FIG. 3) uses the special type indexed property path.

The iterator type predefined UI element 78 includes a template and is linked to an indexed property path. The template represents the layout of the iterator type predefined UI element 78 for a single member (i.e., a single index value) of the property path. During execution, the iterator type predefined UI element 78 creates a copy of the template for each member of the indexed property, and modifies the copy so that it is associated with a property path with the corresponding index value. These new copies are inserted into the user interface as additional UI elements 78. If the range of the indexed property increases (or decreases), more copies are inserted (or removed) as required, so that there is one UI element 78 for each currently available index value. Each copy is linked to the application via its associated property path. An identical approach is taken for treeviews, and rows of drop-down menus.

For example, the 'iterator' UI element 78 provides a table with a 'template' row. The 'iterator' UI element 78 duplicates this 'template' row for each member of the indexed property. Each row can contain arbitrary UT elements 46 with 'wildcard' pathnames (i.e., property paths) that have the current row number substituted in prior to registration. This is shown in the following exemplary code:

objects 34 and a COM property change API 90 and/or C++ objects 34 with associated API 90.

The client portion 22*a* and the server portion 22*b* communicate with each other over the communication channel 94. The protocol modules 70 and 82 establish low-level communication by use of a communications layer. An exemplary protocol is described in Table 1. The protocol can vary from Table 1 depending on how the client portion 22*a* and the sever portion 22*b* are divided between the client node 64 and the server node 60 (e.g., copy of property manager 86 on the client node 64, server portion 22*b* and client portion 22*a* directly connected to each other on same node, etc.). In another embodiment, the protocol modules 70 and 82 are part of the client transceiver 104 (FIG. 2) and the server transceiver 108 (FIG. 2), respectively.

During communication, the server node 60 and the client node 64 batch the communication into a number of messages, which may be compressed or encrypted. For example, in one embodiment, the server node 60 and the client node 64 use HTTP as the transport protocol. The client node 64 sends the server node 60 one or more messages. The server node 60 processes the one or more messages, which may result in various property change events. The server node 60 batches all of the messages queued to be sent to the client node 64 and sends them as the response to the HTTP request from the client node 64. In one embodiment, batching involves the removal of 'outdated' changes. For example if a change list in the batch of queued messages includes A.B.C=x ... A.B.C=y, the entry 'A.B.C=x' is overwritten by the subsequent entry 'A.B.C=y' and can be safely discarded.

```
<table>
    <tbody style='display:none' widget='iterator' range='App.Employee[]'>
        <tr>
            <td>
                <span widget='text' variable='App.Employee[%idx].Name'>Name</span>
            <td>
            <td>
                <span widget='text' variable='App.Employee[%idx].Salary'>Salary</span>
            <td>
        </tr>
    </tbody>
</table>
```

There are a number of other UT elements (e.g., tab, menu, list) that also iterate over indexed properties and share the iterator optimization of being able to display a plurality of elements associated with indexed property paths using a single exemplary element, as described above.

Referring back to FIG. 3, the property/event interface 90 transmits data (e.g., change events, value changes) between the property path manager 86 and the application 26. This interface 90 uses an appropriate API for the implementation of the application 26. In one embodiment, for example, the application 26 is JAVA™ technology-based, and the standard 'JAVABEAN™ Property API' provides the required semantics and is thus used as the property/event interface 90. This standard API 90 allows the property path manager 86 to change the values of properties 38 of application components 34 when those values have been changed by a user through a UI element 46. This standard API 90 also notifies the property path manager 86 about changes within the application 26. Other embodiments can include COM In one embodiment, the batching process also sorts the entries lexicographically in order to aid compression.

The communications protocol, as illustrated in Table 1, relies on informing the client node 64 about which property paths within the application 26 have changed. Communicating in terms of changes to values of property paths is typically a lower overhead than informing the client node 64 about which of the client's display elements 46 to update, and how to update them. In the system 54, the role of the client node 64 is to reflect the current state of the application 26. If network or communication channel latency is high, then the client node 64 displays an incomplete state, but the application 26 can continue functioning correctly. The application 26 continues because the client node 64 and the server node 60 are more loosely coupled than in traditional systems. The server node 60 can be completely unaware of the type of client, or the way in which the client node 64 chooses to reflect the changes in the state of the application 26. This makes the server node 60 more stable and scalable, as new client node 64 features do not affect the server node 60 or the execution of the application 26.

TABLE 1

| Direction | Message | Meaning |
| --- | --- | --- |
| C -> S | Start (identifier for application instance, application descriptor) | Inform the server that a client wishes to start a new application or reconnect to a running one. One client may simultaneously run several applications. The server may veto the execution of an application, based on a stored security policy |
| C -> S | ListenTo (application identifier, pathname) | Register interest in an application property. The server should immediately generate a property-change event for the property to tell the client the current value. |
| C -> S | Map (application identifier, map identifier, pathname 1, pathname 2) | Register interest in a cross-mapped property. Cross-mapped properties are described above. |
| C -> S | Drop (application identifier, pathname) | Remove interest in specified property. |
| C -> S | Set (application identifier, pathname, value) | Set the specified property to the specified value. |
| S -> C | Application identifier, Pathname = value | Inform the client that the value of a property has changed. |
| C -> S | Invoke (Application identifier, string) | Tell the server to parse and execute the specified string. This must represent a call to an accessible method on an object within an application (specified by pathname). Any return value from the call is discarded. The call is represented by a string of the following form Pathname.MethodName (arg, arg, arg . . . ) where arg is either a constant (a number or string) or a property path. The server may veto the execution of such methods based on a stored security policy. |
| C -> S | Null | Used as a heartbeat to indicate to the server that the client is still in existence. |
| C -> S | Close (application identifier) | End the application. |

Notes:
S = server node 60, C = client node 64, pathname = property path.

In other embodiments, the protocol modules 70 and 82 are configured to employ compression schemes within the communications layer that they establish. A property path compression scheme is used within a batch of messages sent within the client node 64, within the server node 60 and/or between the server node 60 and the client node 64. Whenever a batch of messages is sent, the property names used in the second and subsequent message is compressed by sending only the difference between the required property name and the previous property name. For example, rather than sending the message C->S 'ListenTo("Session.Current.Name"),ListenTo("Session.Current.Salary")', the client node 64 sends the message 'C->S ListenTo("Session.Current.Name"),ListenTo(16+"Salary")', where 16 is the number of characters of "Session.Current.Name" that also occur in "Session.Current.Salary". The client node 64 takes advantage of the preceding message by shortening the subsequent message.

Another scheme to shorten the length of messages is for the client node 64 to register interest in a number of property paths by using a wild card. For example, this scheme is used to register interest in all the property paths that supply values for a table. To illustrate this example, the single message 'C->S ListenTo("App.Employee[*].Name")' registers interest in the property paths 'App.Employee[0] .Name', 'App.Employee[1].Name' . . . 'App.Employee[n−1]Name', where n is the size of the App.Employee indexed property. In addition, if the size of the App.Employee property changes, then the client node 64 has implicitly registered interest in all App.Employee[0 to m−1].Name values, where m is the new size.

The property connector API 22 also compresses the property path names. From the server portion 22b to the client portion 22a, in response to a wildcard Listen To request (as in the example above) the server portion 22b compresses its responses by omitting property path names. Rather than sending the messages:
   S->C App.Employee[0].Name=Alf
   S->C App.Employee[1].Name=Bert
   S->C App.Employee[2].Name=Carl, the server portion 22b sends
   S->C array=App.Employee[*].Name
   S->C arrayelement=Alf
   S->C arrayelement=Bert
   S->C arrayelement=Carl, where array and arrayelement are special property names that may be sent efficiently.

The system 54 uses a data compression scheme in messages sent from the server node 60 to the client node 64. The client node 64 stores, at all times, the 'last known' value 50 of each of the property paths that it is displaying in the page 42 in a current value table. In one embodiment, the server node 60 optionally stores a copy of this information, and uses this as a data dictionary to compress values sent. For example, the server node 60 needs to transmit to the client node 64 the message S->C App.Employee[4].Name="Albert". The server node 60 determines, by examining the data dictionary, that the client node 64 already has the value App.Employee[3].Name="Albert" by a previous transmission, and upon determining the value that was sent, then the server node 60 compresses its message to S->C App.Employee[4].Name=copyValue(App.Employee[3].Name), where copyValue is a directive to the client node 64 to use value 50 from its current value table.

In another embodiment, the protocol modules 70 and 82 are configured to employ the data compression scheme in parallel with the property path compression scheme and an array name compression scheme. The protocol modules 70 and 82 utilize this combination of schemes when the size of the description of the 'copyValue' expression is smaller than the literal value. The array name compression scheme is of particular benefit when an array of data on the server node 60 is sorted, and this data is displayed in the UI 42 on the client node 64. The combination of compression schemes described above compresses the message
   S->C App.Employee[0].Name="Albert"
      App.Employee[1].Name="Bert"
      App.Employee[2].Name="Cathy"
      App.Employee[3].Name="Doug"
      App.Employee[4].Name="Elsie"
to
   S->C array="App.Employee[*].Name"
      arrayelement=copyValue 4
      arrayelement=copyValue 3
      arrayelement=copyValue 2
      arrayelement=copyValue 1
      arrayelement=copyValue 0.

In other embodiments, the property connector API 22 is configured so that the server node 60 resource utilization is low. Generally, there are no 'per-client' threads and little 'per-client' state and background processing. There are three classes of applications 26 that can be optimized for scalability, by reducing the amount of processing or storage done per client, or per change. The first class of applications 26 that can be optimized are responsive to user input, but do not pro-actively change values of properties 38. If the client node 64 is dormant, the property connector API 22 can optimize the resource usage on the server node 60 by suspending the application 26 and/or storing client-specific state on the client node 64 until the client node 64 becomes active again.

The second class of applications 26 that can be optimized are those that act as data feeds, for example stock prices. With this class of applications 26, the per-client data is small, whereas the shared data may be large. The property connector API 22 again stores client-specific state on the client node 64 rather than the server node 60, allowing the server node 60 to scale to more client nodes 64. For this class of applications 26, the property connector API 22 allows a single 'worker application instance' to service many clients 64.

The third class of applications 26 that can be optimized are those that generate events faster than the client node 64 can collect them. An example is a stock ticker application that sets the price of a stock every second and communicates with a client node 64 that reads the stock price once every minute. The property connector API 22 reduces the rate of event generation, without involvement from the application 26, to reduce the per-event processing load. This is particularly important for the third class of applications with a large number of clients 64. For applications where the rate of event generation is high compared to the rate of polling by clients, there is a higher than necessary per-client event processing load for connected clients. In one embodiment, the property connector API 22 adds event buffering mechanisms so that the per-event cost is much lower. For example, only one record is updated on the server per event, rather than one per client. At a lower period of event generation, the property connector API 22 scans these records and forwards events to the client records. The property connector API 22 matches, in effect, the rate of event generation to the rate of polling.

For these three classes of applications 26, the property connector API 22 supports different modes of operation where the per-client state and/or processing on the server node 60 is further reduced. This is at the expense of increased bandwidth and/or processing requirements when communication does take place, or at the expense of reduced timeliness of event notification. A client connection may move from a 'highly interactive' mode of operation to a 'resource saving' mode of operation and back many times during its lifetime. Equally, the rate of event generation may be varied according to the server load.

In one embodiment, there are two operating modes for property connector API 22, and additional operations within the operating modes. The normal mode of operation, described above, is called connected mode. The server 60 stores, for each client 64, an instance of the application 26 and a property graph of listener objects 34. In connected mode, there is high per-client state stored on the server 60 and high per client event processing load. However this is low per client poll/invocation processing load, and thus low bandwidth is required.

The second mode of operation is disconnected mode. In disconnected mode, the client state is removed from the server 60 and stored on the client 64. No per client event processing takes place. Either no application 26 is running on the server 60, or only a single shared instance is executing. However, sufficient state is stored on the client 64 to allow the per-client application 26 to be recreated when necessary. The client 64 also stores a description of each property it is interested in, as in connected mode. The property connector API 22 allows a client 64 in disconnected mode to poll. This poll has higher processing and bandwidth costs associated with it than in connected mode. A disconnected client 64 wishing to perform an invoke command (Table 1) must reconnect. Moving from disconnected mode to connected mode, and back, incurs relatively high bandwidth and processing overhead.

The additional operations are specific optimization techniques for fine tuning the connected and disconnected modes of operation for deployments with a large client population. The additional operations are disconnect, reconnect, and one-shot. For the disconnect operation, issued by client 64, the property connector API 22 commands the application 26 to save its state and shut down. This saved state is then sent to the client 64. No per-client state remains on the server 60. The connection then enters the disconnected mode. Heuristics determine when to enter the disconnected state. Entering the disconnected state is only possible for applications 26 that provide a suitable interface, or where a saved state can be created by logging the history of all operations invoked.

During the reconnect operation, issued by client 64, the client 64 sends the saved application state to the server 60 along with a list of properties 38 that the client 64 is interested in. The server 60 restarts the application 26 using the saved state, re-registers interest in all properties 38, and continues in the connected mode. This operation is invoked by a disconnected client 64 that wishes to update the server state (i.e., invoke an operation or set a property).

During the one-shot operation, issued by client 64, the client 64 sends the saved application state to the server 60 along with the list of properties 38 that the client is interested in. The server 60 may restart the application 26, return the current values of the properties 38 and then shut down the application 26. For an application 26 to use this optimization, it must provide the required static method, for example, a single shared instance, or static method, that can take a saved state and return a suitable application instance. This suitable instance may be a shared instance between several clients or may be a new per-client instance. After the property connector API 22 obtains the property values, the property connector API 22 commands the application 26 to stop execution. The one-shot operation is invoked by a disconnected client 64 that wishes to poll, but not change the server state.

In other embodiments, the property connector API 22 is further configured with additional optimizations such as timestamp, slow garbage collector, connectivity check and property set. One optimization that the property connector API 22 uses is the timestamp. For many applications based on data feeds (e.g. stock tickers), the majority of properties 38 that a client 64 has registered interest in may not change between polls. In the disconnected mode, this may result in one-shot operations providing a large amount of unnecessary state data. To alleviate this, the property connector API 22 adds a timestamp-based property interface. For example, in one embodiment, the property connector API 22 uses the two commands 'Timeid getCurrentTimestamp( )' and 'Object getChangedProperty(String name, Timeid since)'.

The 'getChangedProperty' command returns a property value if it has changed since the specified timestamp. The 'getCurrentTimestamp' command returns the current time. In replies from disconnect or one-shot operations, the server 60 provides the current timestamp as an additional parameter. In calls to one-shot or reconnect operations, the client 64 provides this timestamp, and is informed of property values if they have changed since this timestamp was issued.

In another embodiment, the property connector API 22 uses the slow garbage collector optimization, which requires the cooperation of the application 26. When a client 64 performs a reconnect and/or one-shot operation, if the previous application instance is still available (i.e., has not been garbage collected), then this instance can be used as in connected mode. This optimization does not apply if the application 26 has been 'stopped' explicitly on disconnect, but many applications are 'passive' and do not require a stop interface.

In another embodiment, the property connector API 22 uses the Connectivity Check collector optimization. When using the 'slow garbage collector' optimization, above, a client 64 wishing to perform reconnect or one-shot operations first determines whether the server 60 still has a valid application instance. If the server 60 does, then the saved state and property list does not need to be sent. When successful, this optimization reduces the bandwidth requirement. When unsuccessful, it incurs an additional 'round trip' from the client 64 to the server 60 and back.

In another embodiment, the property connector API 22 uses the property set optimization. It is noted that if a server 60 is supporting a large number of clients 64, all of which use the same user-interface, then it is likely that many of the clients 64 will be interested in exactly the same set of properties. During disconnect mode, the server 60 associates the set of properties 38 that the client 64 is interested in with an set identifier, and the client 64 uses this set identifier during one-shot and reconnect operations, rather than sending the complete list of properties 38. Using the set identifier incurs a small additional memory requirement on the server 60, as many clients share the same property set, but saves considerably in the bandwidth requirement of the one-shot and reconnect operations.

Figure 7B:
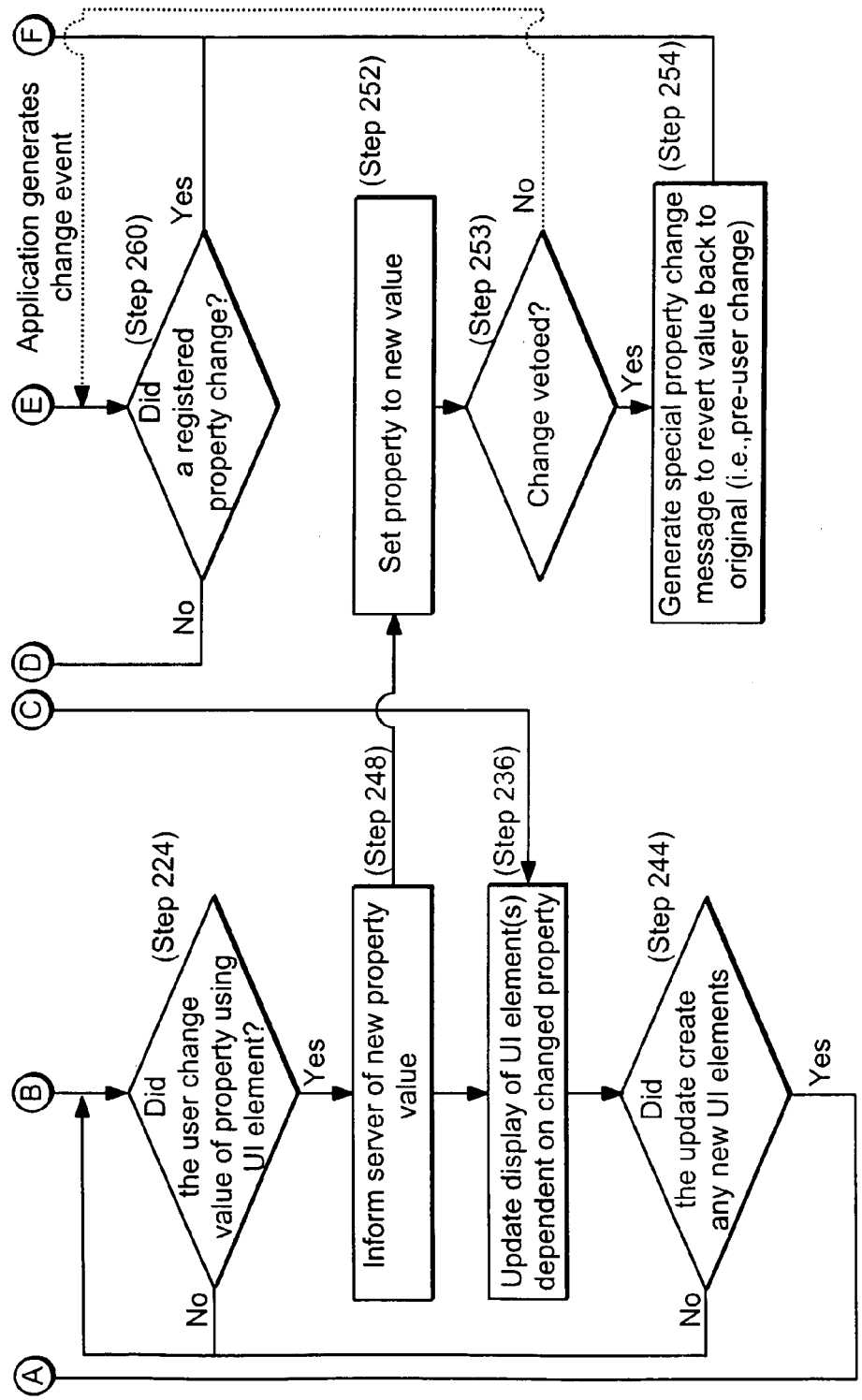
FIG. 7 is a flow diagram of an embodiment of client and server interaction constructed in accordance with the invention.

FIG. 7 depicts a flow diagram of an embodiment of a process by which the server node 60 and client node 64 interact in accordance with the invention. The first step is that the client node 64 establishes a connection with the server node 60 to connect (step 200) to an executing application 26 or to request (step 200) initiation of execution of the application 26. The server node 60 authenticates the client node if required and connects the client node 64 to the application 26, if executing, or initiates execution of the application 26 as requested (step 204).

The client portion 22a scans the UI 42 and identifies (step 208) a UI element 46 within the UI 42 that is associated with a property path and has not been initialized (e.g., inserted into table and registered). The client portion 22a inserts (step 212) into its table the identified UI element 46 and its associated property path. The client portion 22a registers (step 216) interest in this property path with the server portion 22b. The client portion 22a determines (step 220) whether there are any more UI elements 46 in the UI 42 that are associated with a property path and have not been initiated. If there are more UI elements 46 in the UI 42 that have not been initiated, then the client portion 22a repeats steps 208, 212 and 216 for each of the additional UI elements 46 that are not initiated. When all of the UI elements 46 have been initiated, the client portion 22a monitors (step 224) the UI elements 46 for user changes.

When the client portion 22a registers (step 216) interest in a property path, the server portion 22b, through the property/event interface 90, determines (step 228) the initial value for the registered property path. The server portion 22b sends (step 232) the determined initial value to the client portion 22a. The client portion 22a updates (step 236) the identified UI element 46 with the initial value. If there are any other UI elements 46 associated with the same property path, the client portion 22a updates (step 236) those elements 46 with the initial value also. The server portion 22b updates (step 240) the tree structure map 160 with the registration of interest for the property path, received from the client portion 22a, and the determined initial value.

The client portion 22a determines (step 244) whether the update of the UI element(s) 46 resulted in creating one or more additional UI elements 46 (e.g., additional employees were added to the list). If one or more additional UI elements 46 were added, then the client portion 22a repeats steps 208, 212 and 216 for each of the additional UI elements 46. If no additional UI elements 46 are added, the client portion 22a monitors (step 244) the UI elements 46 for user changes.

While monitoring (step 224) the UI elements 46, the client portion 22a determines (step 224) whether the user changed the value of an existing UI element 46. If the user does not change the value of an existing UI element 46, then the client portion 22a continues to monitor (step 224) the UI elements 46. If the user does change the value of an existing UI element 46, then the client portion 22a informs (step 248) the server portion 22b of the change. If there are any other UI elements 46 associated with the same property path as the changed UI element 46, the client portion 22a also updates (step 236) those UI elements 46 with the changed value and determines (step 244) whether any new UI elements 46 are created as a result of the change.

Upon being informed (step 248) by the client portion 22a, the sever portion 22b attempts to update (step 252), via the property/event interface 90, the value of the property 38 of the application component 34 affected by the user change (i.e., the property 38 at the end of the property path associated with the user-interface element 46 the user changed). The application 26 determines (step 253) whether to accept the change or to veto the change. If the application 26 accepts the change, the application 26 changes the state (e.g., value) of the property 38 as requested by the server portion 22b and generates a change event. The server portion 22b receives the change event and determines (step 260) whether the change corresponds to a property path in which the client portion 22a has interest and acts in response to that determination. In one embodiment, the server portion 22b inhibits sending a change event to the client portion 22a for the changed property 38, because the client portion 22a originated the change.

If the application 26 does not accept the change (e.g., vetoes the change), the server portion 22b generates (step 254) a special change message to change the value of the property path, as displayed on the UI 42, back to the original (i.e., pre-user modification) value. The server portion 22b continues by sending (step 232) the change message with the original value back to the client portion 22a.

After the tree structure 160 has been updated (step 240), the server portion 22b continues to monitor (step 256) the properties corresponding to the tree structure map 160. If a state (e.g., value) of a property changes, the server portion 22b determines (step 260) whether the change corresponds to a property path in which the client portion 22a has interest. If the server portion 22b determines (step 260) the changed state of the property does not correspond to a registered property path, the server portion 22b continues to monitor (step 256) the states of properties corresponding to the tree structure map 160. If the server portion 22b determines (step 260) the changed state of the property does correspond to a registered property path, the server portion 22b generates and sends (step 232) to the client portion 22a a change event for the corresponding property path. The client portion 22a updates (step 236) any UI elements 46 associated with the property path with the changed value.

The property connector API 22 also can be configured to provide additional features. For one example, if in the system 54 of FIG. 3 the client node 64 and/or page interface 112 (e.g., browser) is unable to run the client portion 22a or support some or all of the UI elements 46 required for the specific user-interface 42, then the property connector API 22 can generate a proxy process (not shown). The proxy process can execute on the server node 60, or on another server node 60' (not shown) logically located between the client node 64 and the server node 60 executing the application 26. The proxy process acts as a client portion 22a in as far as communications with the server portion 22b, and acts as a standard server process, using an alternative, compatible protocol, to communicate with the client node 64.

For example, a system 54' includes a client node 64' that has an older version of a Web browser 112' that is unable to support the client process 22a. The proxy process receives the interactive page 42 and the dynamic changes indicated by the property connector API 22 and, in real-time, converts the page 42 and the dynamic changes into a static page 42' that is compatible with the older version Web browser 112'. The converted static page 42' includes traditional style links and input boxes to replace the dynamic mouse events and text fields used with the client portion 22a. When the user clicks on a link, the client node 64' requests a new page 42' from the proxy process. The proxy process interprets this as a click on a portion of the interactive page 42, and if this results in a change to a state of a property, the proxy process sends the change to the state of the property to the server portion 22b. The proxy process then generates a new static page 42", in real time, to represent the new UI state and sends the new page 42"' to the client node 64'.

Figure 8:
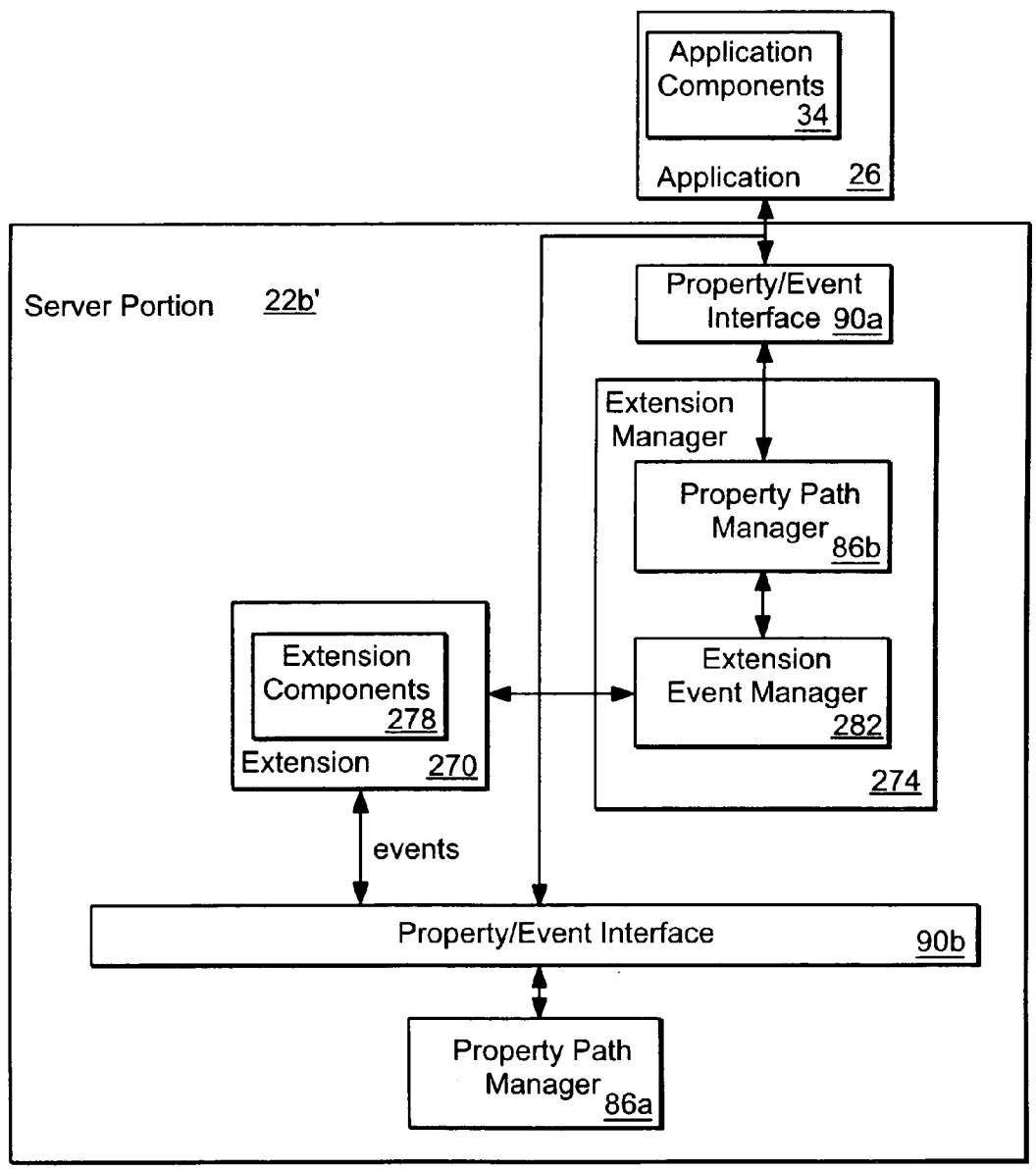
FIG. 8 is a block diagram of another embodiment of the server portion with an extension feature according to the invention

FIG. 8 depicts an embodiment of the server portion 22b' of the property connector API 22 configured to provide an additional feature of executing an extension 270. The server portion 22b' includes a first property path manager 86a, a first property/event interface 90a, a second property/event interface 90b, the extension 270 and an extension manager 274. The extension 270 includes extension components 278, analogous to the application components 34. The extension 270 is a process that augments the application 26, becomes an 'extension' of the application 26. Two exemplary extensions are a page extension and a form extension. To the client portion 22a, the extension 270 acts like a part of the application 26. To the application 26, the extension 270 acts like part of the client portion 22a. The extension manager 274 includes a second property path manager 86b and an extension event manager 282.

A request to execute an extension 270 is included in the UI 42. The page interface 112 loads the UI 42 and when the client portion 22a encounters the extension request, the client portion 22a sends the request to the server portion 22b to initiate execution of the extension 270. An exemplary request command for a page extension is 'Session.PageView=newExtension('PageView','App.Employee[]',10)'. With receipt of this command, the server portion 22b initiates execution of the named extension 'PageView' on the server node 60. In accordance with the parameters of the command, the server portion 22b initializes the extension 270 with the values 'App.Employee[]' and 10. The extension 270 registers interest in the App.Employee[] property path with the property path manager 86b, and is told of all members of this indexed property, and any changes.

The PageView extension 270 provides an indexed property Page[i], which is an indexed property of 'Page' objects 278. Each Page object 278 in turn provides an indexed property 'Item[j]', which is an indexed property of items on the current page 42. The PageView extension 270 allows the App.Employee property to be accessed via a number of pages 42a to 42i, where i is the number of pages. For example the property path 'Session.PageView.Page[0].Item[0]' is equivalent to property path 'App.Employee[0]'. The first employee is displayed on the first page. Similarly, the property path 'Session.PageView.Page[1].Item[4]' is equivalent to the property path 'App.Employee[14]' because after the first ten employees (the entered parameter was ten), the next ten employees are displayed on a second page. The PageView extension 270 also provides other properties such as NoPages, CurrentPage, NextPage, LastPage, and the like, to make it easy to build page based interfaces to applications 26 that do no themselves support multiple pages 42a to 42i.

Another extension is the 'Form' extension. The form extension provides a means for 'batch processing' of application data. The form extension allows transactional input to an application 26. For example, a user may fill in a form 42a (not shown) displayed in a UI 42 and then cancel or submit the filled in form 42a as a whole, instead of piecemeal data. If the server portion 22b' is configured with a form extension 270, the client portion 22a creates a form 42a by a call to Session.newExtension. This command takes two mandatory parameters, 'String id' and 'String type' and one optional parameter 'String args'. The 'String id' parameter includes the name of the extension (e.g. 'myform') and is in the format 'Session.myform'. The 'String type' parameter includes the type of the extension, which for a form extension, is in the format 'Form'. The 'String args' parameter includes an optional argument string. For the form extension, the format is one of ' ' (i.e., null), 'snapshot', 'weakchanges' or 'snapshot, weakchanges'. The snapshot and weakchanges modes are described in more detail below.

The form extension 270 is configured to accept several methods. One method is 'submit( )', which transmits all changed values to the form extension 270 to update the application 26. Another method is 'refresh( )', which refreshes all values within the form 42a, including changed ones, to be the same as the corresponding application properties 38. Another method is 'update( )', which refreshes all of the unchanged values to be the same as the corresponding application properties 38. The method is useful for unconnected forms. Another method is 'clear( )', which resets all changed values to null. This method is useful for complex forms. Another method is 'clear(v)', which resets all changed values to v.

The call to create a form 42a is usually made in a script type UI element to ensure that the form 42a is initialized before UI elements 46 using the form 42a are displayed. The form 42a is global and may be used anywhere on the page 42, not just inside the script UI element 46. An exemplary code used to create a form 42a is as follows:

```
<div widget="script" onstart="invoke_server(this,'Session.newExtension(\'F\',\'Form\')')">
    <table>
        <tr>
            <td><b>Employee</b></td>
            <td><b>Salary</b></td>
        <tr>
        <tbody style='display:none' widget='iterator' range='Session.F.App.Employee[]'>
            <tr>
                <td><span widget='text' variable='%itm.Name'>Name</span></td>
                <td><input widget='value' variable='%itm.Salary'></td>
            <tr>
        </tbody>
    </table>
    <input type="button" value="Clear" onclick="invoke_server(this,'Session.F.clear(0)')">
    <input type="button" value="Reset" onclick="invoke_server(this,'Session.F.refresh( )')">
    <input type="button" value="Submit" onclick="invoke_server(this,'Session.F.submit( )')">
</div>
```

When the server portion 22b' is configured with a form extension 270, the property paths 'Session.Form.App.Name' and 'Session.Form.App.Employee[5].Salary' have the same value as the property paths 'App.Name' and 'App.Employee[5].Salary'. Any change to a property starting 'Session.Form' is recorded in the form extension 270 and not applied to the application 26 until the client portion 22a invokes a Session.Form.submit( ) method. In one embodiment, the client portion 22a invokes a 'Session.Form.submit( )' when the user clicks on a UI element button labeled submit. Alternatively, the client portion 22a invokes a Session.Form.cancel( ) method, in which case nothing will change.

The form extension 270 works by acting as a filter over other properties 38. For example a form 42a can be identified as 'Session.Form'. For example, this form 42a displays values associated with property paths such as 'Session.Form.App.Name', 'Session.Form.App.Employee[2].Salary' and the like. There is no need to define what properties correspond to a form 42a, as the properties 38 are associated dynamically as they are referred to by UI elements 46 within the page 42.

By default, a form 42a is connected and set to preserves Changes. That is, if an application property 38 changes during the lifetime of the form 42a, the form 42a reflects the change unless the user has already changed the value. This also means that if the page 42 wishes to display new values in the form 42a, then this will happen automatically (e.g., iterator type UI elements 78b or treeview type UI elements 78g).

In various embodiments, the form 42a can be set to different modes. In one embodiment, the form 42a may optionally be set to 'snapshot' mode, where it is unconnected and all values will be null until entered by the user or the form 42a is manually refreshed. In another embodiment, the form 42a may also be optionally set to 'weakchanges' mode, where changes to values from the application 26 will overwrite changes made by the user.

In one embodiment, if an application property 38 changes that is an ancestor of a property 38 displayed on the form 42a, and the form 42a is connected or manually updated, then the dependent properties on the form 42a are updated even if the user has changed them. For example, a form 42a displays App.Employee[0].Name (=Fred) and App.Employee[0].Salary (=100). If the user changes the salary to 200 (e.g., Fred's salary), and then the application 26 changes who App.Employee[0] is (e.g. to Bill, Salary 50), then the form 42a correctly displays App.Employee[0].Name=Bill and App.Employee[0].Salary=50, discarding the users original, and now invalid, user change. As a consequence, if ancestor properties change as a result of submitting a number of changes in a form 42a, then it is possible that some of the changes are discarded.

In some embodiments, data is not batched and sent to the server node 60 all at once. For example, the updates can be transmitted to the application sequentially, or in a random order. The application 26 reacts to the data as if it were entered all at the same time, due to the interaction of the form extension 270 on the server node 60.

EQUIVALENTS

While the invention has been particularly shown and described with reference to several exemplary embodiments thereof, it will be understood by those skilled in the art that various changes in form and detail may be made therein without departing from the spirit and scope of the invention.

For example, although the methods and apparatus of the present invention are described in the context of a Web server and Web client process communicating over the Internet, those skilled in the art will recognize that the present invention also can be practiced in non-Web and/or non-Internet embodiments. The invention also can be practiced over any other type of network (e.g., telephone, cable, LAN, WAN, wireless, fiber), within the same physical computer system, or with portions of the invention (e.g. the application independent client process) operating in an Internet appliance or cable TV set-top box.

What is claimed is:

1. In a system including an application having a plurality of components, at least one component having a property, each property being identified with an identifier, a method of associating an element of a user-interface to a current state of a property, the user-interface created independently of the application with which the user interface interacts, the method comprising:
  (a) aassociating an element of a user-interface with a property path, the property path including a concatenation of a plurality of identifiers, the concatenation of identifiers defining a path through a plurality of application components to a property at the end of the concatenation;
  (b) mapping the property path to a current state of the property at the end of the path defined by the concatenation of identifiers to associate the element of the user-interface with the current state of that property;

(c) detecting a change in one of a plurality of states in an application, each state in the plurality corresponding to one of the states mapped to an identifier in the concatenation of the property path;

(d) examining each identifier in the concatenation of the property path in succession, starting with an identifier corresponding to the changed one of the states of the plurality of states;

(e) determining for a currently examined identifier, a new next state of a property with a name identical to the currently examined identifier;

(f) re-mapping the currently examined identifier to the new next state in response to a change in a currently mapped state;

(g) repeating the steps of detecting a change in one of a plurality of states in an application and of examining each identifier in the concatenation of the property path in succession, for each subsequent identifier in the concatenation of identifiers; and (h) updating the element of the user-interface associated with the property path responsive to the detected change.

2. The method of claim 1 wherein step (b) further comprises:

(b-1). examining each identifier in the concatenation of the property path in succession;

(b-2). determining, for the first identifier in the concatenation of the property path, a second state of a property with a name identical to the first identifier, a component of the application containing that property becoming a root application component;

(b-3). identifying, for the first identifier, a component of the application to which the second state points as a current application component;

(b-4). mapping the first identifier to the second state;

(b-5). determining for the next identifier in the concatenation of the property path, a next state of a property with a name identical to the next identifier located within the current application component;

(b-6). identifying, for the next identifier, a component of the application to which the next state points as a current application component;

(b-7). mapping the next identifier to the next state; and (b-8). repeating steps e(b-5) trough (b-7) until the last identifier of the concatenation is examined to map the property path to the current state of the property with a name identical to the last identifier.

3. The method of claim 1 wherein step (b) further comprises mapping the property path to an undefined state if no property is found that corresponds to an identifier in the plurality of identifiers in the concatenation.

4. The method of claim 1 wherein step (b) further comprises generating a node tree having a plurality of nodes, wherein each node of the node tree represents a mapping of an identifier to one of, a state of a property and an undefined state.

5. The method of claim 4 wherein the node tree represents a plurality of property paths.

6. The method of claim 1 further comprising the step monitoring a plurality of states within the application to detect a change in one of the states of the plurality of states, each state in the plurality corresponding to one of the states mapped to an identifier in the concatenation of the property path.

7. The method of claim 6 wherein the step of monitoring further comprises receiving a property change event from a JAVABEAN-compatible component.

8. The method of claim 6 further comprising re-mapping the property path to a new current state in response to detecting the change in one of the states of the plurality of states.

9. The method of claim 6 further comprising re-mapping the identifier the concatenation of identifiers to the changed state in response to detecting the change in one of the states of the plurality of states.

10. The method of claim 1 further comprising the step of generating a property change message in response to a change in a state of a property corresponding to one of the identifiers in the concatenation of the property path.

11. The method of claim 1 further comprising the step of updating one or more user-interface elements associated with the property path with a new current state in response to a change in the current state of the property.

12. The method of claim 1 wherein step (g) further comprises terminating the repeating in response to the new next state being identical to a state currently mapped for that currently examined identifier.

13. The method of claim 1 further comprising the step of monitoring a new plurality of states within the application, the new plurality including the new next states mapped to an identifier in the concatenation of the property path.

14. The method of claim 1 wherein the property path is a first property pat and the concatenation of identifiers includes a wildcard identifier and further comprising:

mapping a second property path to a first value; and determining a second value for the wildcard identifier in response to the first value mapped to the second property path.

15. The method of claim 14 wherein the step of determining the second value further comprises determining the second value such that replacing the wildcard identifier of the first property path with the second value causes the current state mapped to the first property path with the replaced wildcard identifier to be equal to the value mapped to the second property path.

16. The method of claim 1 further comprising dynamically binding the property path to one of the application components including the property corresponding to the current state mapped to that property path.

17. The method of claim 1 further comprising transmitting to the application a request to update the current state of the property mapped to the property path associated with the element of the user-interface in response to a user modification of the value.

18. The method of claim 17 further comprising inhibiting a property change message in response to the application updating the current state of the property in response to the request to update.

19. The method of claim 1 wherein the user interface comprises an exemplary element associated with a property path including a wildcard identifier, the wildcard identifier corresponding to an indexed property including an index value range from a minimum value to a maximum value, further comprising:

generating an additional element for each index value of the indexed property from the minimum value to the maximum value by copying the given element associated wit the property path; and associating a new property path with each add additional element.

20. The method of claim 19 further comprising replacing the wildcard identifier associated with the given element with the corresponding index value of the additional element to define the new property path.

21. The method of claim 1 further comprising registering interest in the property path.

22. The method of claim 1 wherein the step of mapping further comprises mapping one of the identifiers in the concatenation of the property path to a state of a property corresponding to the one of the identifiers.

23. The method of claim 1, wherein set (a) further comprises associating a component in the application with a property path including a concatenation of a plurality of identifiers.

24. The method of claim 1 further comprising the step of invoking a method responsive to an update to an element of the user-interface.

25. The method fo claim 1 further comprising the step of providing, to a method, a property path identifying a component in the application.

26. A system for associating an element of a user-interface to a current state of a property of an application, the application having a plurality of components, at least one component having a property, each property being identified with an identifier, the user-interface created independently of the application with which the user interface interacts, the system comprising:
a property connector module configured:
(1) to identify an association between an element of a user-interface and a property path, the property path including a concatenation of a plurality of identifiers defining a path through a plurality of application components to a property at the end of the concatenation;
(2) to map the property pat to a current state of the property at the end of the path defined by the concatenation of identifiers, thereby associating the element of the user-interface with the current state of that property;
(3) to detect a change in one of a plurality of states in an application, each state in the plurality corresponding to one of the states mapped to an identifier in the concatenation of the property path,
(4) to examine each identifier in the concatenation of the property path in succession, starting with an identifier corresponding to the changed one of the states of the plurality of states:
(5) to determine for a currently examined identifier, a new next state of a property with a name identical to the currently examined identifier;
(6) to re-map the currently examined identifier to the new next state in response to a change in a currently mapped state;
(7) to repeat steps (3) through (6) for each subsequent identifier in the concatenation of identifiers, and
(8) to update the element of the user-interface associated with the property path responsive tote detected change.

27. The system of claim 26 wherein the property connector module is further configured to:
(2-1). examine each identifier in the concatenation of the property path in succession;
(2-2). determine, for the first identifier in the concatenation of the property path, a second state of a property with a name identical tote first identifier, a component of the application containing that property becoming a root application component;
(2-3). identify, for the first identifier, a component of the application to which the second state points as a current application component;
(2-4). map the first identifier to the second state;
(2-5). determine, for the next identifier in the concatenation of the property path, a next state of a property with a name identical to the next identifier located within the current application component;
(2-6). identify, for the next identifier, a component of the application to which the next state points as a current application component;
(2-7). map the next identifier to the next state; and
(2-8). repeat steps (2-5) through (2-7) until the last identifier of the concatenation is examined to map the property path to the current state of the property with a name identical to the last identifier.

28. The system of claim 26 wherein the property connector module is further configured to map the property path to the current state further comprises mapping the property path to an undefined state if no property is found that corresponds to an identifier in the plurality of identifiers in the concatenation.

29. The system of claim 26 wherein the property connector module is further configured to generate a node tree having a plurality of nodes, wherein each node of the node tree represents a mapping of an identifier to one of, a state of a property and an undefined state.

30. The system of claim 29 wherein the node tree represents a plurality of property paths.

31. The system of claim 26 wherein the property connector module is further configured to monitor a plurality of states within the application to detect a change in one of the states of the plurality of states, each state in the plurality corresponding to one of the states mapped to an identifier in the concatenation of the property path.

32. The system of claim 31 wherein the property connector module is further configured to receive a property change event from a JAVABEAN-compatible component.

33. The system of claim 31 wherein the property connector module is further configured to re-map the property path to a new current state in response to detecting the change in one of the states of the plurality of states.

34. The system of claim 31 wherein the property connector module is further configured to re-map the identifier the concatenation of identifiers to the changed state in response to detecting the change in one of the states of the plurality of states.

35. The system of claim 26 wherein the property connector module is further configured to generate a property change message in response to a change in a state of a property corresponding to one of the identifiers in the concatenation of the property path.

36. The system of claim 26 wherein the property connector module is further configured to update one or more user-interface elements associated with the property path with a new current state in response to a change in the current state of the property.

37. The system of claim 26 wherein the property connector module is further configured to terminate the repeating in response to the new next state being identical to a state currently mapped for that currently examined identifier.

38. The system of claim 26 wherein the property connector module is further configured to monitor a new plurality of states within the application, the new plurality including the new next states mapped to an identifier in the concatenation of the property path.

39. The system of claim 26 wherein the property path is a first property path and the concatenation of identifiers includes a wildcard identifier and the property connector module is farther configured to:

map a second property path to a first value; and determine a second value for the wildcard identifier in response to the first value mapped to the second property path.

40. The system of claim 39 wherein the property connector module is further configured to determine the second value such that replacing the wildcard identifier of the first property path with the second value causes the current state mapped to the first property path with the replaced wildcard identifier to be equal to the value mapped to the second property path.

41. The system of claim 26 wherein the property connector module is further configured to dynamically bind the property path to one of the application components including the property corresponding to the current state mapped to that property path.

42. The system of claim 26 wherein the property connector module is further configured to transmit to the application a request to update the current state of the property mapped to the property path associated with the element of the user-interface in response to a user modification of the value.

43. The system of claim 42 wherein the property connector module is further configured to inhibit a property change message in response to the application updating the current state of the property in response to the request to update.

44. The system of claim 26 wherein the user interface comprises an exemplary element associated with a property path including a wildcard identifier, the wildcard identifier corresponding to an indexed property including an index value range from a minimum value to a maximum value, and the property connector module is further configured to:

generate an additional element for each index value of the indexed property from the minimum value to the maximum value by copying the given element associated with the property path; and associate a new property path with each additional element.

45. The system of claim 44 wherein the property connector module is further configured to replace the wildcard identifier associated with the given element with the corresponding index value of the additional element to define the new property path.

46. The system of claim 26 wherein the property connector module is further configured to register interest in the property path.

47. The system of claim 26 wherein the property connector module is further configured to map one of the identifiers in the concatenation of the property path to a state of a property corresponding to the one of the identifiers.

48. The system of claim 26 further comprising:

a client node including: the user interface having one or more elements; and a client portion of the property connector module.

49. The system of claim 26 further comprising: a server node including: the application; and a server portion of the property connector module.

* * * * *